US012565032B2

(12) United States Patent
Wei et al.

(10) Patent No.: US 12,565,032 B2
(45) Date of Patent: Mar. 3, 2026

(54) IN-LINE LAMINATION PROCESS FOR PRODUCING DECORATIVE THERMOPLASTIC COMPOSITE PANELS

(71) Applicants: Liqing Wei, Forest, VA (US); Ruomiao Wang, Forest, VA (US); Mark O. Mason, Forest, VA (US)

(72) Inventors: Liqing Wei, Forest, VA (US); Ruomiao Wang, Forest, VA (US); Mark O. Mason, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 288 days.

(21) Appl. No.: 17/525,453

(22) Filed: Nov. 12, 2021

(65) Prior Publication Data

US 2022/0266583 A1      Aug. 25, 2022

Related U.S. Application Data

(60) Provisional application No. 63/188,358, filed on May 13, 2021, provisional application No. 63/145,073, (Continued)

(51) Int. Cl.
B32B 37/06 (2006.01)
B32B 3/30 (2006.01)

(Continued)

(52) U.S. Cl.
CPC ................ B32B 37/06 (2013.01); B32B 3/30 (2013.01); B32B 5/028 (2013.01); B32B 7/12 (2013.01); B32B 27/08 (2013.01); B32B 27/12 (2013.01); B32B 27/20 (2013.01); B32B 27/32 (2013.01); B32B 37/10 (2013.01); B32B 37/12 (2013.01); B32B 37/144 (2013.01); B32B 37/156 (2013.01); B32B 38/0004 (2013.01); B32B 38/06 (2013.01); B32B 38/145 (2013.01); B32B 2255/10 (2013.01); B32B 2255/26 (2013.01); B32B 2262/101 (2013.01); B32B 2305/022 (2013.01); B32B 2305/08 (2013.01); B32B 2305/18 (2013.01); B32B 2307/4026 (2013.01);

(Continued)

(58) Field of Classification Search
None
See application file for complete search history.

(56) References Cited

U.S. PATENT DOCUMENTS

| 2,343,740 | A | * | 3/1944 | Birmingham | .......... | B27N 7/005 |
| | | | | | | 156/278 |
| 3,684,645 | A | * | 8/1972 | Temple | .................. | B29C 70/12 |
| | | | | | | 428/338 |

(Continued)

FOREIGN PATENT DOCUMENTS

WO      WO2016183079      * 11/2016  ............... B32B 5/18

*Primary Examiner* — Linda L Gray
(74) *Attorney, Agent, or Firm* — Rhodes IP PLC; Christopher R Rhodes

(57) ABSTRACT

In-line systems and in-line methods of producing lightweight reinforcing thermoplastic composite panels are described. The in-line systems and in-line method can be used to produce composite panels with smoother surfaces and enhanced properties in an automated manner. The produced composite panels can include a decorative layer that can provide an overall smoother panel surface compared to a composite panel lacking a decorative layer.

20 Claims, 19 Drawing Sheets

Related U.S. Application Data filed on Feb. 3, 2021, provisional application No. 63/112,914, filed on Nov. 12, 2020.

(51) Int. Cl.

| | |
|---|---|
| *B32B 5/02* | (2006.01) |
| *B32B 7/12* | (2006.01) |
| *B32B 27/08* | (2006.01) |
| *B32B 27/12* | (2006.01) |
| *B32B 27/20* | (2006.01) |
| *B32B 27/32* | (2006.01) |
| *B32B 37/00* | (2006.01) |
| *B32B 37/10* | (2006.01) |
| *B32B 37/12* | (2006.01) |
| *B32B 37/14* | (2006.01) |
| *B32B 38/00* | (2006.01) |
| *B32B 38/06* | (2006.01) |

(52) U.S. Cl.

CPC ..... *B32B 2307/538* (2013.01); *B32B 2307/54* (2013.01); *B32B 2307/718* (2013.01); *B32B 2307/7265* (2013.01); *B32B 2307/732* (2013.01); *B32B 2323/00* (2013.01); *B32B 2323/10* (2013.01); *B32B 2419/00* (2013.01); *B32B 2605/00* (2013.01)

(56) References Cited

U.S. PATENT DOCUMENTS

| | | | | |
|---|---|---|---|---|
| 5,316,604 | A * | 5/1994 | Fell | B29C 66/91931 |
| | | | | 428/116 |
| 6,922,965 | B2 * | 8/2005 | Rosenthal | B32B 3/06 |
| | | | | 52/592.1 |
| 9,580,848 | B2 * | 2/2017 | Henderson | D04H 1/49 |
| 2003/0159777 | A1 * | 8/2003 | Tsujimoto | B32B 38/1816 |
| | | | | 156/543 |
| 2003/0224145 | A1 * | 12/2003 | Campion | D04H 1/72 |
| | | | | 264/172.19 |
| 2011/0247839 | A1 * | 10/2011 | Lalouch | D04H 1/4209 |
| | | | | 264/109 |
| 2020/0277214 | A1 * | 9/2020 | Courtemanche | G02B 5/0215 |

* cited by examiner

302 ～ 304

306

306 ～ 402 410

410

1400

1450

1446

1440 { 1442

1444

1430

1420

1414

1410 { 1412

1416

1500

1512

1514

1516

1510

1552

1554

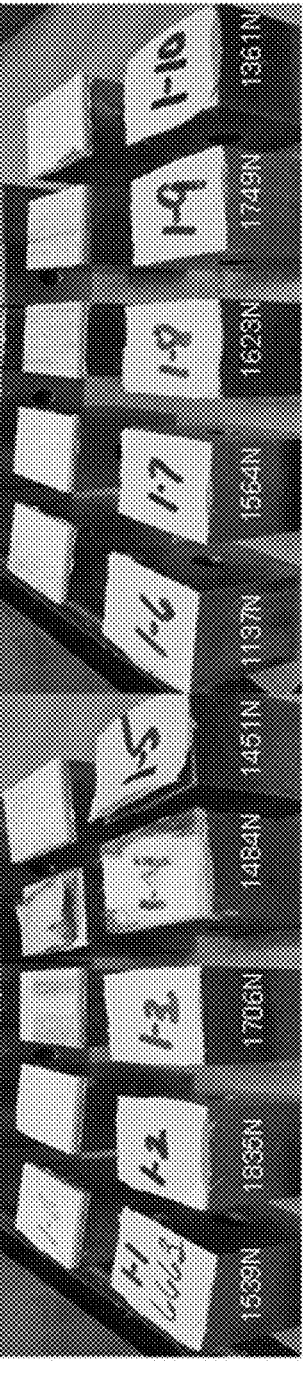
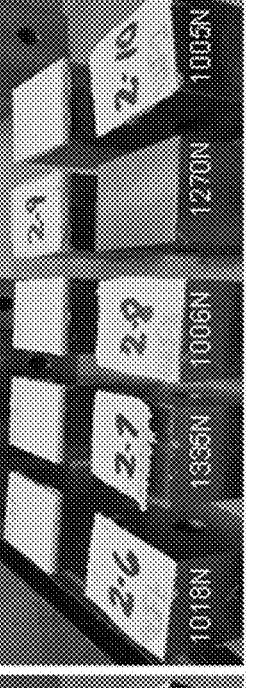
FIG. 17(A)
FIG. 17(B)

IN-LINE LAMINATION PROCESS FOR PRODUCING DECORATIVE THERMOPLASTIC COMPOSITE PANELS

PRIORITY APPLICATIONS

This application claims priority to, and the benefit of, each of U.S. Application No. 63/112,914 filed on Nov. 12, 2020, U.S. Application No. 63/145,073 filed on Feb. 3, 2021 and U.S. Application No. 63/188,358 filed on May 13, 2021. The entire disclosure of each of these applications is hereby incorporated herein by reference.

TECHNOLOGICAL FIELD

Certain configurations described herein are directed to an in-line lamination process that can produce a decorative panel. In some examples, the decorative panel can be used in recreational vehicles or in building applications.

BACKGROUND

Production of decorative panels can be time consuming and tedious. In many cases, different components of the panels are produced in different processes or at different sites.

SUMMARY

Certain aspects, configurations, embodiments and examples are described of in-line processes that can be used to produce decorative panels that can be used in recreational vehicles or building applications.

In an aspect, a process of producing a thermoplastic composite article using an in-line system is described. In certain configurations, the in-line process comprises combining reinforcing materials and a thermoplastic material in an aqueous solution. The in-line process can also include disposing the aqueous solution with the combined reinforcing materials and the thermoplastic material onto a moving support. The in-line process can also include removing water from the disposed aqueous solution on the moving support to form a web comprising open cell structures formed from the reinforcing materials and the thermoplastic material. The in-line process can also include drying the web on the moving support to provide a porous core layer. The in-line process can also include heating the dried, porous core layer on the moving support to melt the thermoplastic material of the heated, porous core layer. The in-line process can also include disposing a first skin layer on a first surface of the heated, porous core layer on the moving support. The in-line process can also include disposing a second skin layer on a second surface of the heated, porous core layer on the moving support. The in-line process can also include applying pressure to the heated, porous core layer comprising the disposed first skin layer and the disposed second skin layer on the moving support to provide a thermoplastic composite article.

In certain embodiments, the porous core layer is heated at a first temperature above the melting point of the thermoplastic material and below the melting point of the reinforcing materials. In some embodiments, the in-line process can include adding a foam to the aqueous solution with the combined reinforcing materials and the thermoplastic material. In other examples, the in-line process can include adding a lofting agent to the aqueous solution with the combined reinforcing materials and the thermoplastic material. In additional examples, the in-line process can include configuring the first skin layer as a scrim. In some embodiments, the in-line process can include configuring the second skin layer as a patterned layer. In certain examples, a pattern of the patterned layer includes one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern. In other embodiments, the thermoplastic material comprises a polyolefin and the reinforcing materials comprise inorganic fibers.

In some examples, a surface roughness (Ra) of the thermoplastic composite article is less than 3 microns in the machine direction and in the cross direction as measured by a stylus profilometer according to ISO 4287:1997. In other examples, a surface roughness (Ra) of the thermoplastic composite article is less than 2 microns in the machine direction and in the cross direction as measured by a stylus profilometer according to ISO 4287:1997.

In some embodiments, the first skin layer is disposed on the heated, porous core layer without using any adhesive between the first skin layer and the heated, porous core layer. In certain embodiments, the in-line process comprises disposing an adhesive on the second surface of the heated, porous core layer prior to disposing the second skin layer on the second surface. In some embodiments, the adhesive comprises a polyolefin or a polyurethane. In certain examples, the in-line process comprises cutting a groove into a first end of the thermoplastic composite panel. In other examples, the in-line process comprises cutting a tongue in a second end of the thermoplastic composite panel.

In some embodiments, the in-line process comprises consolidating the heated, porous core layer prior to disposing the first skin layer on the first surface and prior to disposing the second skin layer on the second surface.

In certain examples, the in-line process comprises heating the thermoplastic composite article after consolidating the thermoplastic composite article to increase an overall thickness of the thermoplastic composite article.

In additional examples, the in-line process comprises printing a pattern onto the second skin layer prior to disposing the second skin layer on the second surface of the heated, porous core layer.

In other embodiments, the in-line process comprises printing a pattern onto the second skin layer after disposing the second skin layer on the second surface of the heated, porous core layer.

In other embodiments, the in-line process comprises compressing lateral edges of the heated, porous core layer, wherein the compressed lateral edges of the heated, porous core layer have a lower thickness than a thickness at a central area of the heated, porous core layer.

In another aspect, an in-line system configured to produce a thermoplastic composite article is provided. In certain embodiments, the in-line system comprises a fluid reservoir configured to receive an aqueous solution, a thermoplastic material and reinforcing materials, wherein the fluid reservoir is configured to mix the thermoplastic material and the reinforcing materials in the aqueous solution to provide a homogeneous dispersion of the thermoplastic material and the reinforcing materials in the aqueous solution. In other embodiments, the in-line system comprises a moving support fluidically coupled to the fluid reservoir and configured to receive the homogeneous dispersion from the fluid reservoir and retain the homogeneous dispersion on the moving support. In some examples, the in-line system comprises a pressure device configured to remove water from the homogeneous dispersion on the moving support to provide a web comprising open cell structures formed from the reinforcing materials and the thermoplastic material. In certain examples, the in-line system comprises a device configured to dry and heat the web on the moving support to provide a porous core layer on the moving support. If desired, a separate drying device and a heating device can also be used. In other examples, the in-line system comprises a heating device configured to heat the porous core layer on the moving support to melt the thermoplastic material of the porous core layer. In additional examples, the in-line system comprises a first supply device configured to receive a first skin material, wherein the first supply device is configured to provide the first skin material as a first skin layer onto a first surface of the porous core layer on the moving support. In other embodiments, the in-line system comprises a second supply device configured to receive a second skin material, wherein the second supply device is configured to provide the second skin material as a second skin layer onto a second surface of the porous core layer on the moving support. In additional configurations, the in-line system comprises a consolidating device configured to consolidate the heated, porous core layer with the disposed first skin layer and the disposed second skin layer by applying pressure to the heated, porous core layer, the disposed first skin layer and the disposed second skin layer to provide a substantially planar thermoplastic composite article.

In certain embodiments, the first supply device is configured to receive a roll of the first skin material. In other embodiments, the second supply device is configured to receive a roll of the second skin material. In additional embodiments, the in-line system further comprises a device configured to cut the thermoplastic composite article into individual sheets as the thermoplastic composite article exits the moving support. In some examples, the in-line system comprises a second heating device positioned after the consolidating device, wherein the second heating device is configured to heat the thermoplastic composite article to increase an overall thickness of the thermoplastic composite after consolidation. In other configurations, the in-line system comprises a sprayer fluidically coupled to the fluid reservoir, wherein the sprayer is configured to spray the homogeneous dispersion onto the moving support. In some embodiments, the in-line system comprises an adhesive reservoir configured to dispose an adhesive on the second surface of the heated, porous core layer prior to disposing the second skin layer on the second surface of the heated, porous core layer.

In certain configurations, the in-line system comprises a printer configured to print a pattern on the second skin layer after the second skin layer is disposed on the second surface of the heated, porous core layer. In other embodiments, the in-line system comprises a printer configured to print a pattern on the second skin material before the second skin layer is disposed on the second surface of the heated, porous core layer. In some embodiments, the in-line system comprises a processor configured to control movement of the moving support.

In another aspect, a recreational vehicle (RV) wall comprises a first laminated lightweight reinforced thermoplastic composite article comprising a porous core layer, a first skin layer on a first surface of the porous core layer and a patterned second skin layer on a second surface of the porous core layer. In some examples, the RV wall comprises a foam layer coupled to the first laminated lightweight reinforced thermoplastic composite article at a first surface of the foam layer, wherein the foam layer is coupled to the first laminated lightweight reinforced thermoplastic composite article through the first skin layer of the first laminated lightweight reinforced thermoplastic composite article so the patterned second skin layer is present on an interior surface of the recreational vehicle wall. In other embodiments, the RV wall comprises a support structure coupled to a second surface of the foam layer at a first surface of the support structure. In additional examples, the RV wall comprises a second laminated lightweight reinforced thermoplastic composite article coupled to a second surface of the support structure, wherein the second laminated lightweight reinforced thermoplastic composite article comprises a porous core layer, a first skin layer on a first surface of the porous core layer and a second skin layer on a second surface of the porous core layer. In some embodiments, the RV wall comprises an exterior panel coupled to the second laminated lightweight reinforced thermoplastic composite article. In some examples, the exterior panel comprises fiberglass or aluminum. In other examples, the support structure comprises tubing or a network.

In certain embodiments, the patterned second skin layer comprises one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern. In some embodiments, the first skin layer of the first laminated lightweight reinforced thermoplastic composite article comprises a scrim. In other embodiments, the porous core layer in the first laminated lightweight reinforced thermoplastic composite article comprises a web comprising open cell structures formed from reinforcing fibers held together by a thermoplastic material. In other configurations, the porous core layer in the second laminated lightweight reinforced thermoplastic composite article comprises a web comprising open cell structures formed from reinforcing fibers held together by a thermoplastic material. In certain examples, the thermoplastic material in each porous core layer independently comprises a polyolefin. In some embodiments, the reinforcing materials in each porous core layer comprise glass fibers. In other embodiments, the thermoplastic material in each porous core layer is polypropylene.

In another aspect, a recreational vehicle comprising a roof, side walls coupled to the roof, and a floor coupled to the sidewalls to provide an interior space within the recreational vehicle, wherein at least one of the sidewalls comprises a recreational vehicle wall panel as described herein. In some embodiments, the recreational vehicle comprises wheels to permit towing or driving of the recreational vehicle.

Additional aspects, configurations, embodiments and examples are described below.

BRIEF DESCRIPTION OF THE SEVERAL VIEWS OF THE DRAWINGS

Certain specific illustrations are described below to facilitate a better understanding of the technology described herein with reference to the accompanying drawings in which:

FIG. 17A and FIG. 17B are illustrations showing specimens used in a flatwise tensile test, in accordance with certain embodiments;

DETAILED DESCRIPTION

It will be recognized by the person of ordinary skill in the art, given the benefit of this description, that the different layers described herein are not necessarily shown to scale. No material is intended to be required in any one layer unless specifically indicated in the description in connection with that particular configuration. The thicknesses, arrangements and end-uses of the decorative panels may vary.

In certain embodiments, the processes described herein can be used to produce decorative panels for use in building applications, vehicles such as recreational vehicles and for other uses. Recreational vehicles (RVs), including motorhomes and towables, can incorporate light weight glass fiber reinforced thermoplastic composite panels into sidewalls, ceiling, roofing, or flooring parts to reduce the weight. Compared with traditionally used wood composites, i.e. plywood, the polymeric composites provide abundant benefits, such as better durability, being free of formaldehyde, lighter weight for fuel efficiency, improved acoustic performance, water and mold resistant, and flame retardancy, which benefits derive from the high degree of functional integration of glass and the thermoplastic resin matrix. In some configurations, reinforcing fibers, e.g., glass fibers, can advantageously impart to the modulus of elasticity of the resin matrix, resulting in property enforcement at a minimal weight increase. The performance of the resultant composite can depend, at least in part, on the core's formulation (fiber/resin ratio), weight per unit area (areal density), panel application thickness, and functional skin materials.

In certain embodiments, the decorative layer, sometimes referred to herein as décor, can be used to cover/hide the underlying materials porous and rough texture and provide more natural material appearances. For example, a decorative skin can be bonded to an underlying web or core layer in an on-line process so it generally cannot be separated from the composite core. The resulting composite article can exhibit strong tensile strength, which eliminates the issue of decorative skin/core delamination at the interfaces between layers within the RV sidewall construction. The decorative skin material can also improve flexural stiffness of the board, especially in the machine direction. The patterned panels can also pass ASTM E84 Class A flame retardancy classifications.

Figure 1:
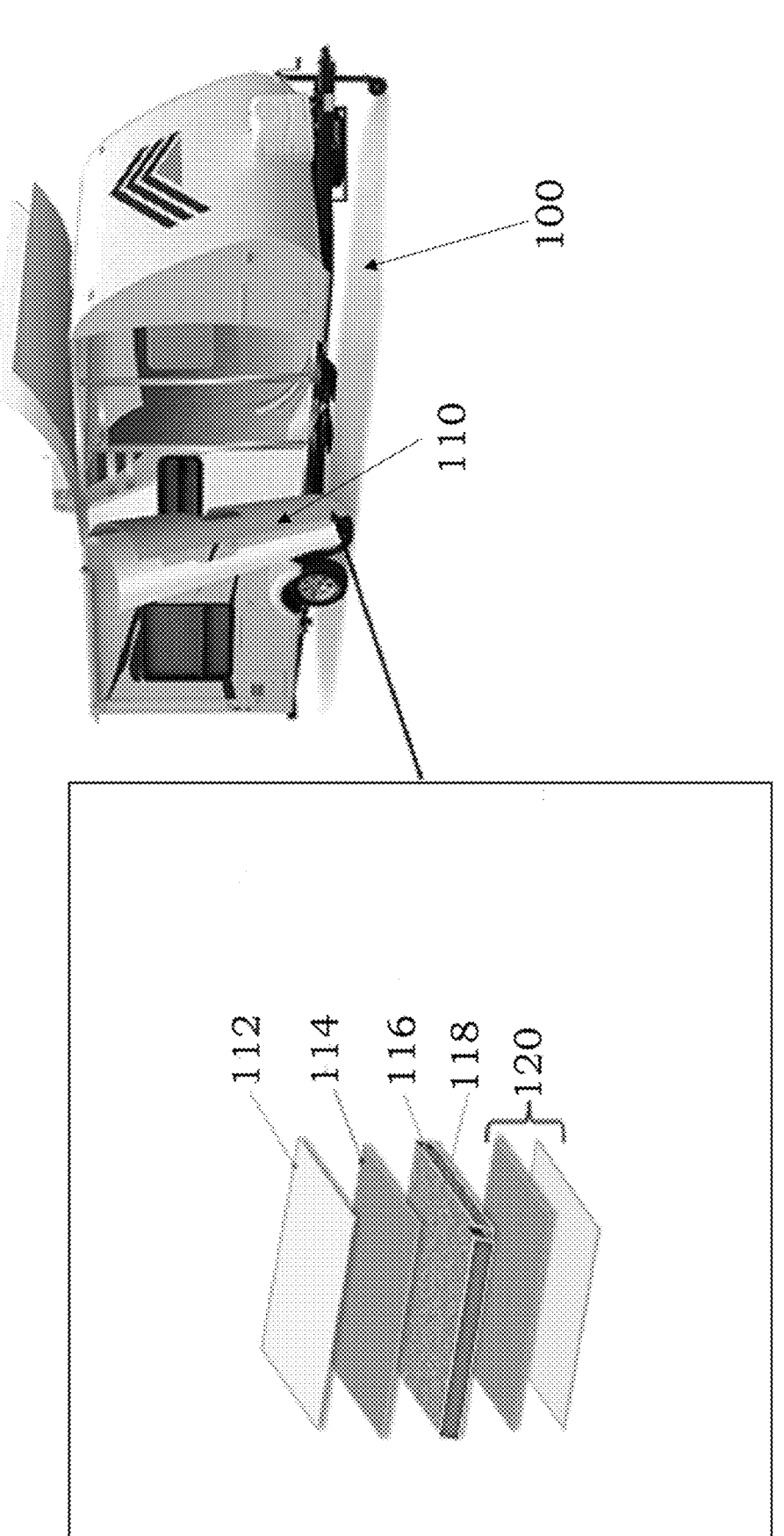
FIG. 1 is a simplified illustration showing a recreational vehicle side wall, in accordance with some embodiments.

In certain embodiments, light weight reinforced thermoplastic (LWRT) composites can be used as RV sidewall and roofing applications. RV sidewall constructions normally include the exterior wall material, a foam insulation (e.g., PET, EPS or a honeycomb foam), and the interior wall layer, all of which are laminated or bonded together, and then installed to a roof and a floor to provide strength to the overall unit. For example and referring to FIG. 1, a simplified illustration shows an RV 100 and a RV sidewall 110. The exploded view of the sidewall 110 includes a fiberglass exterior 112, a LWRT layer 114, a chassis 116, e.g., a metal cage or tubular structure, a foam 118 and another LWRT 120 which is typically on an interior surface of the RV. The LWRT 120 can include a decorative pattern on an inner surface of the RV interior that is visible to a person inside the RV. As noted below, the LWRT 120 can include a porous web in combination with a decorative skin and optionally additional skin layers. In conventional production methods, decorative paper or vinyl films are applied onto a substrate (typically plywood) off-line. However, in the past few years, concern about formaldehyde emissions, poor durability of plywood, and the high cost of the off-line lamination process by using polyurethane (PUR) glue to bond the decorative materials onto plywood have stimulated the interest in developing a product by in-line laminating the decorative material onto a durable composite panel. In-line laminated decorative composite panels can provide similar or better high-quality surfaces, gloss, and color, depending on the design/patterns, as compared to off-line laminated plywood/décor panels.

Figure 2:
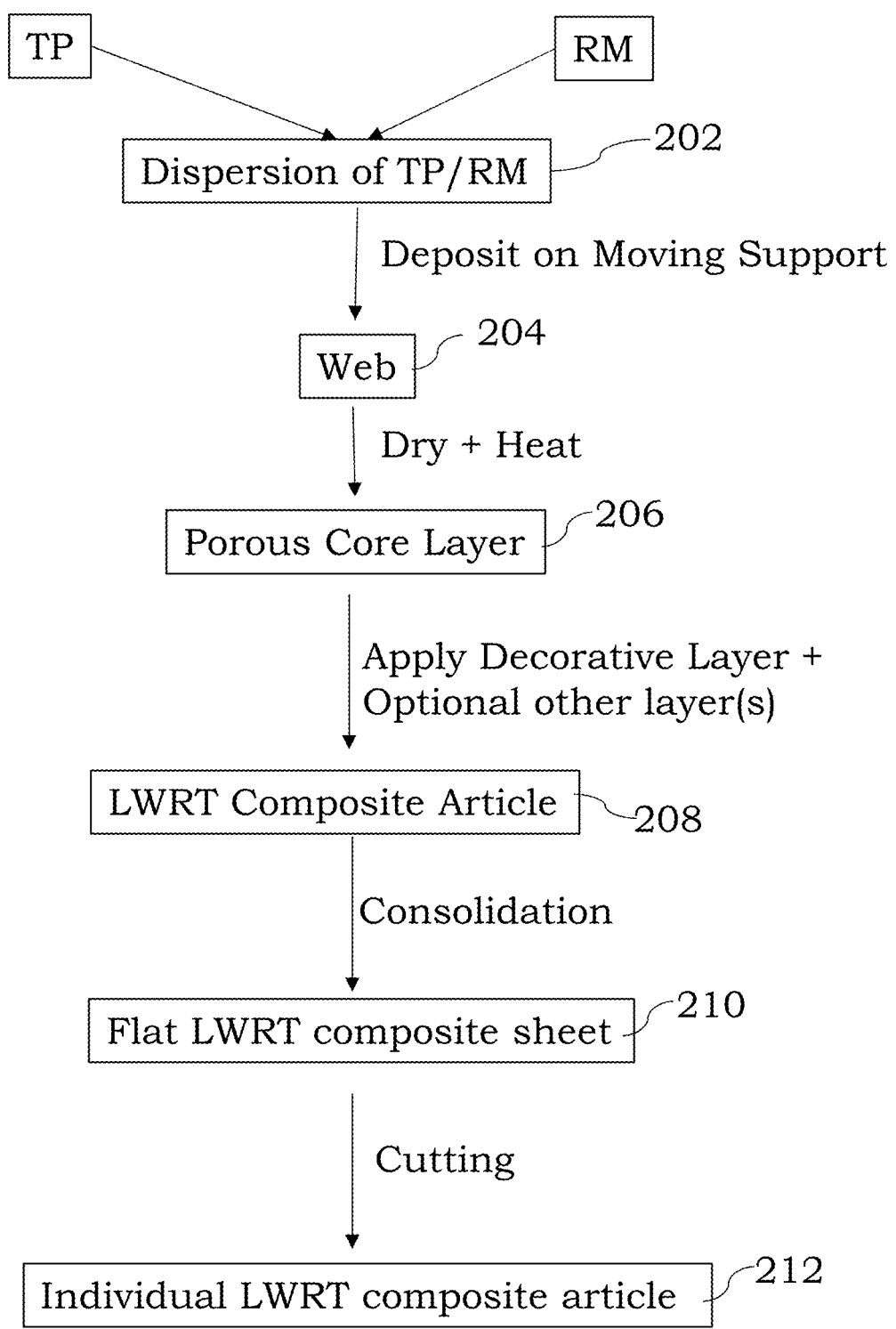
FIG. 2 is a block diagram showing certain steps of an in-line process that can be used, in accordance with some embodiments.

In certain embodiments, an in-line process to produce a decorative panel can include numerous steps which are typically controlled in an automated manner using a processor or computer as described in more detail below. Certain steps of the process, and the various materials used/produced by each step, are shown by way of the block diagram in FIG. 2. A LWRT layer is prepared by combining a thermoplastic material (TP, e.g., a thermoplastic resin and reinforcing materials (RM) to form a dispersion or mixture 202. This mixture can then be deposited onto a suitable moving support to provide a web 204 formed by the reinforcing materials and the thermoplastic resin. The resulting web can include open cell structures of reinforcing fibers held in place by the thermoplastic material. The resulting web can be heated and dried to soften or melt the thermoplastic resin and form a porous core layer 206. One or more skin layers can then be applied to a surface of the formed and heated porous core layer. For example, a decorative layer can be applied to form a LWRT composite article 208. The resulting LWRT composite can be consolidated into a flat sheet 210, which can be used in forming the RV panel or other composite panels. For example, the flat sheet 210 on the moving support can be cut to provide an individual LWRT composite article 212. Various illustrations of process conditions, steps and materials are described in more detail below.

Figure 3:
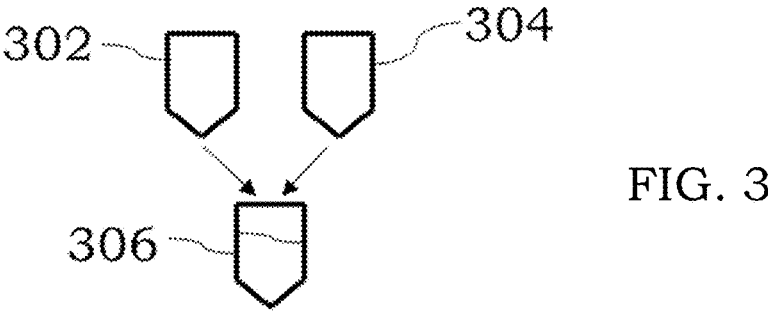
FIG. 3 is an illustration showing certain components that can be used to add materials into a mixing tank, in accordance with certain examples.

As shown in FIG. 3, a thermoplastic material can be present in a reservoir 302 and reinforcing fibers (or other reinforcing materials) can be present in a second reservoir 304. Each of the thermoplastic material and the reinforcing fibers can be metered, sprayed, or otherwise introduced into an aqueous solution in a mixing tank 306 comprising water, a liquid or an aqueous solution. If desired, a foam or other additives (as discussed below) may be present in the mixing tank 306. The thermoplastic material and reinforcing fibers can be mixed for a suitable time and at a suitable temperature to provide a substantially homogenous aqueous dispersion of the fibers and the thermoplastic material. For example, the materials may be mixed at room temperature, e.g., about 25 deg. Celsius, or above room temperature or below room temperature by heating or cooling the mixing tank. In some embodiments, the materials can be added continuously into the mixing tank 306 to permit continuous deposition of the dispersion onto a moving support as noted below. While the exact mixing time may vary depending on the materials used, illustrative mixing times include 10 seconds to about 10 minutes, more particularly about 30 seconds to about 5 minutes. As noted above, however, in instances where the materials are continuously added to the mixing tank 306, mixing is performed constantly. The mixing tank 306 can include a paddle mixer, an impeller or other devices to facilitate mixing.

Figure 4A:
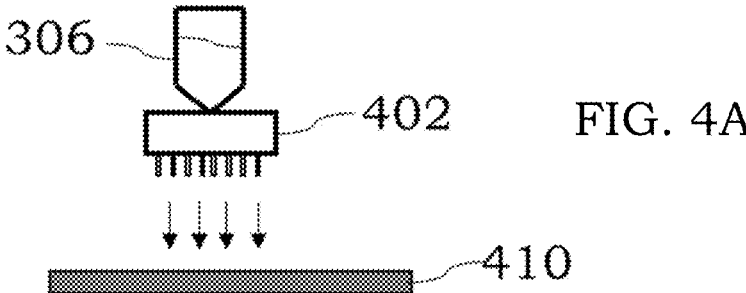
FIG. 4A and FIG. 4B are illustrations of a moving support, in accordance with some embodiments.
Figure 4B:
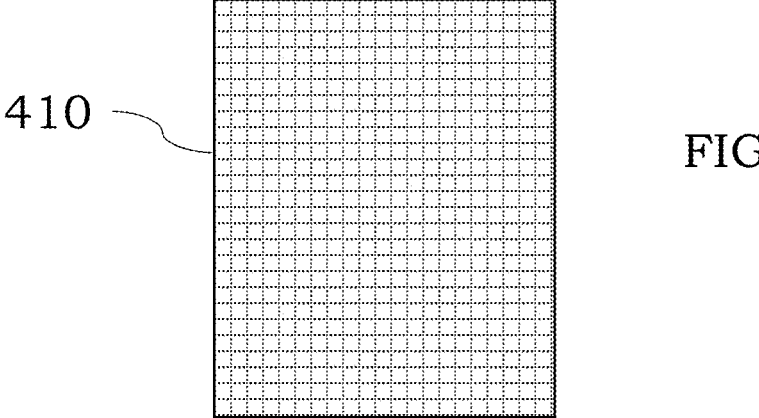

In certain embodiments and referring to FIG. 4A, the dispersion in the mixing tank 306 can be sprayed, dripped or otherwise deposited onto a moving support 410. While the moving support 410 is shown as a single segment in certain figures depicted herein, the moving support 410 could be broken up into two or more individual segments as desired. The mixing tank 306 can be fluidically coupled to a plurality of spray heads 402 that can spray the dispersion onto a surface of the moving support 410. As shown in FIG. 4B, the moving support 410 can be porous or include a mesh that can receive the dispersion. The exact deposition rate used may vary depending on the amount of material to be deposited per square meter. The moving support 410 may move at a continuous and constant speed to permit continuous spraying of the dispersion along a top surface of the moving support 410. The area of the moving support 410 under the spray heads may be heated, cooled or present at room temperature during deposition of the dispersion. As noted below, different areas of the moving support 410 may have different temperatures. The exact dimensions of the moving support 410 can vary and typically the moving support is about 4 feet wide and can include a mesh or pore size of about 60 openings/square inch to about 80 openings/square inch of moving support 410. The moving support 410 permits receipt of the dispersion and movement of the received dispersion to additional sites or stations of the in-line system. At the end of the moving support 410, the formed LWRT articles can be cut and stacked. The moving support 410 permits continuous formation of LWRT articles. In certain embodiments, the moving support 410 can be split into two or more separate sections or segments. For example, a wet mat can be formed on a former belt and then transferred, e.g., manually or automatically, onto a separate dryer belt where it can pass through an oven or other drying device.

Figure 5A:
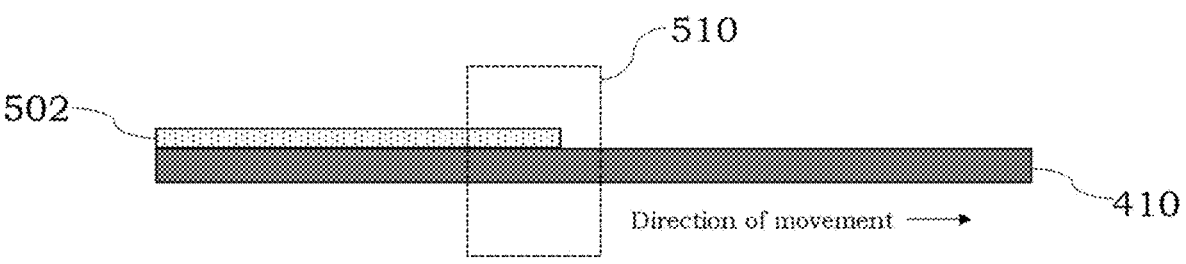
FIG. 5A, FIG. 5B and FIG. 5C are illustrations showing a drying device, in accordance with certain embodiments.
Figure 5B:
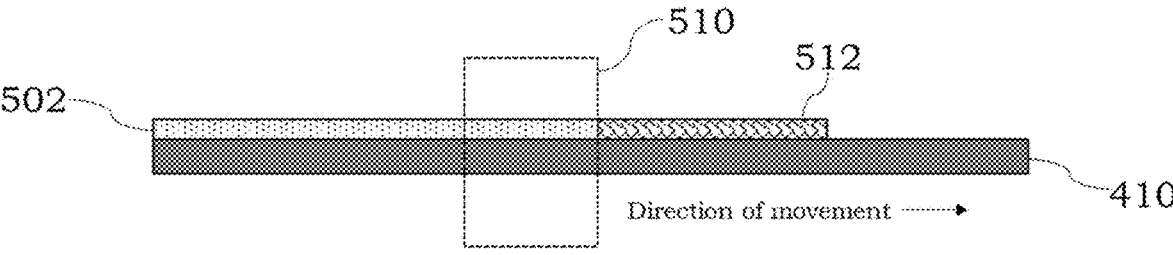
Figure 5C:
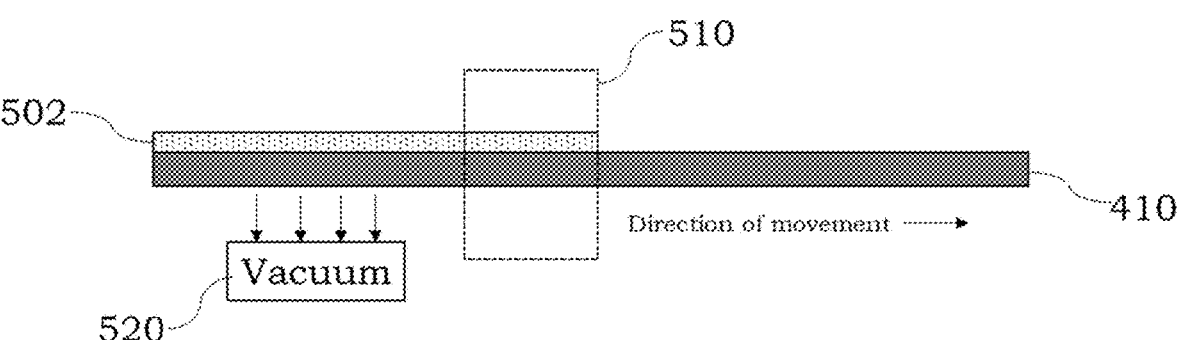

In certain embodiments and referring to FIG. 5A, the moving support 410 with the dispersion of the thermoplastic material and reinforcing fibers can migrate to a drying device 510. The drying device 510 can provide heat and/or a negative pressure (vacuum) to remove the water from the web 502 on the moving support and leave behind the reinforcing fibers and the thermoplastic material on the moving support 510. This process can form a core layer 512 (see FIG. 5B) with a high porosity that includes open cell structures formed from the reinforcing fibers that are held in place by the thermoplastic material. If desired, other materials may also be present in the core layer or sprayed onto the core layer 512. For example, an adhesive from a reservoir can be sprayed on a surface of the formed core layer 512. The exact temperature used to heat the web 502 and/or core layer 512 may vary and desirably the temperature is above a melting point of the thermoplastic material and below a melting point of the reinforcing fibers. In some examples, the moving support itself 410 can be heated, whereas in other examples the drying device 510 can include a heating element or be configured as an oven or other heating devices. If desired, the drying device 510 and the moving support 410 can both provide heat to the web 502 on the moving support 410. In some instances, the moving support 410 can include a thermally conductive material that can retain the heat from the drying device 510 to assist in maintaining the core layer 512 in a softened form during application of skin layers or other materials. In some examples, the a pressure device 520 separate from the drying device 510 may be present (see FIG. 5C). For example, a vacuum may be applied to the web 502 to remove water from the web and leave behind the reinforcing materials and the thermoplastic material. The pressure device 520 is typically upstream of the drying device 510 and is designed to remove at least 40% by volume of the water from the web 502, more particularly about 60% by volume of the water from the web 502. If desired, another pressure device (not shown) can be downstream of the pressure device 520.

Figure 6A:
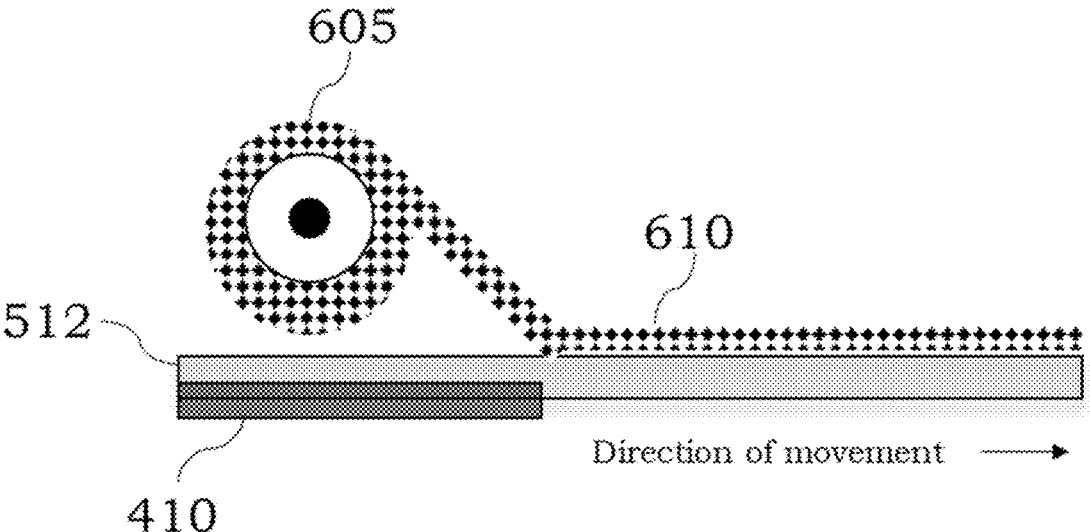
FIG. 6A and FIG. 6B are illustrations showing application of a skin layer to a core layer, in accordance with certain embodiments.
Figure 6B:
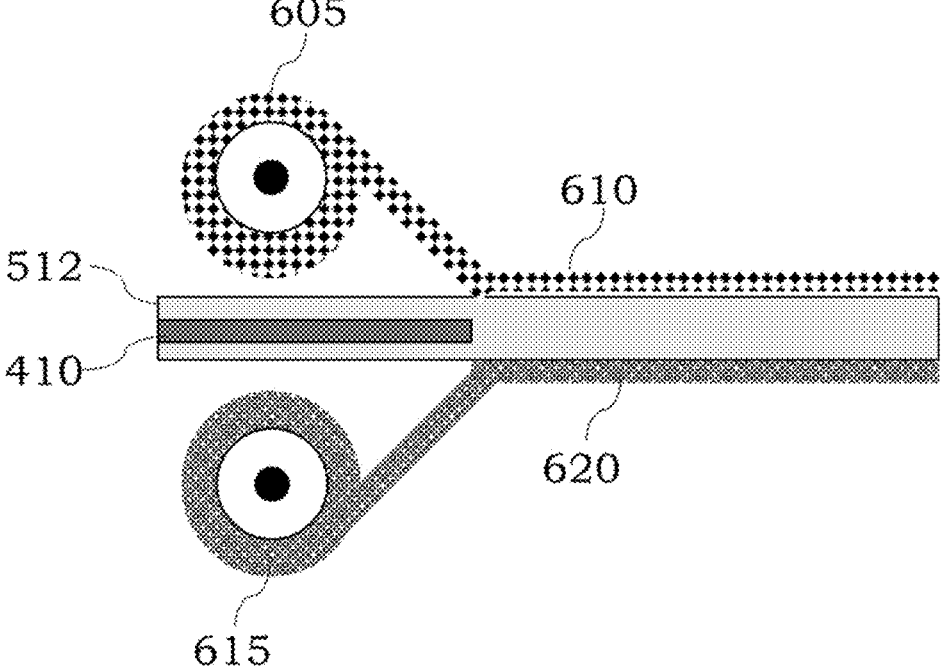

In certain embodiments, as the core layer 512 exits the drying device 510, one or more skin layers can be applied to a surface of the core layer in an automated manner. Referring to FIG. 6A, an illustration is shown where a skin layer 610 is applied to a core layer 512 as the core layer 512 exits the moving support 410. For example, the skin layer 610 may be present as a roll of skin layer material 605 that is unrolled and applied in a continuous manner to one surface of the core layer 512. As shown in FIG. 6B, a second skin layer 620 can be applied to a second surface of the core layer 512 from a second roll 615 including the second skin material. The skin layers 610, 620 can be applied at room temperature even though the core layer 512 still may be heated otherwise be present on the moving support 410 above room temperature. Alternatively, the rolls 605, 615 or skin layers 610, 620, or both, can be heated prior to being applied to the surfaces of the core layer 512. The skin layers 610, 620 can generally be applied in a continuous manner to form a thermoplastic composite article that includes the core layer 512, a first skin layer 610 and optionally a second skin layer 620. While not shown, additional skin layers can be applied on top of the skin layer 610, 620 using a similar process.

Figure 7:
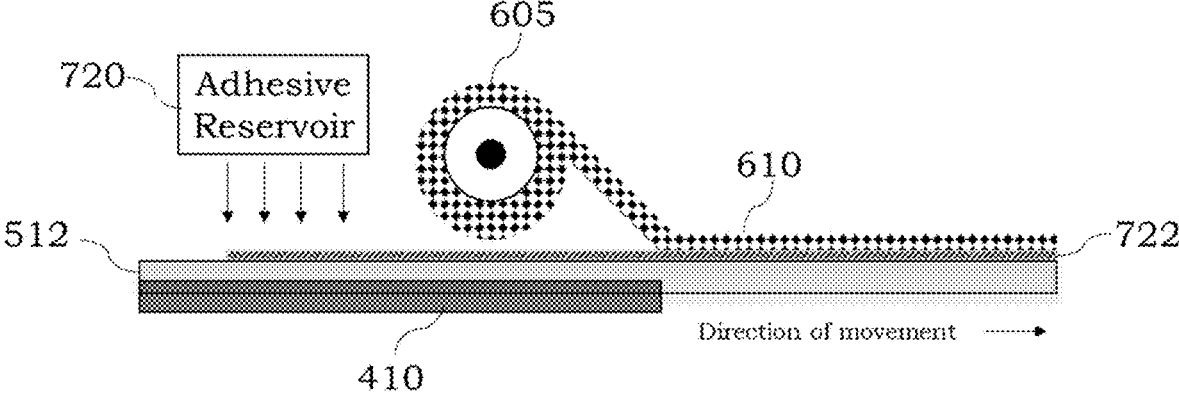
FIG. 7 is an illustration showing an adhesive layer reservoir that can be used to apply an adhesive to a surface of a core layer, in accordance with some examples.

In some embodiments, it may be desirable to apply an adhesive layer on the core layer 512 prior to applying the skin layer 610 to the core layer 512. In such instances, an adhesive reservoir 720 (See FIG. 7) can be present and used to spray adhesive on a surface of the core layer 512 prior to application of the skin layer 610, so an adhesive layer 722 is present on the surface of the core layer 512. The exact adhesive used may vary from thermoplastic adhesives, thermosetting adhesives or combinations thereof. While not shown, an adhesive can also be applied to an opposite surface of the core layer 512 prior to application of the skin layer 620 to the core layer 512. Illustrative adhesives include polyolefin adhesives, polyurethane adhesives and combinations thereof.

Figure 8A:
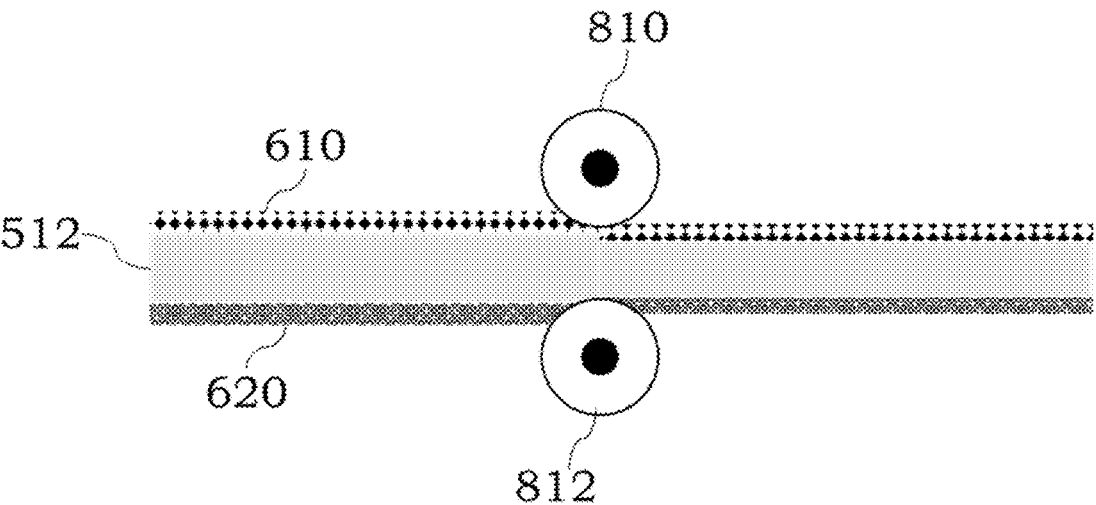
FIG. 8A and FIG. 8B are illustrations showing rollers that can be used in an in-line process, in accordance with some examples.
Figure 8B:
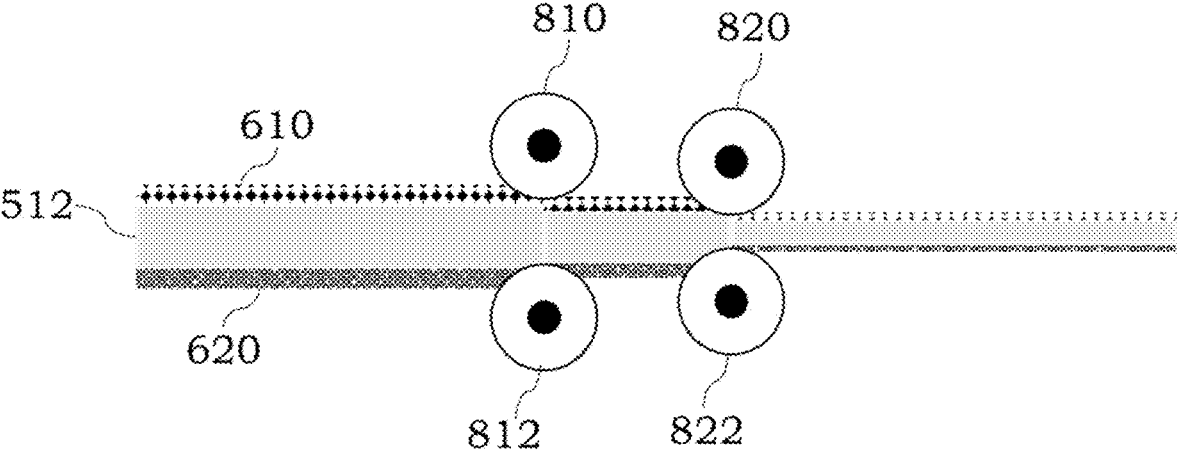

In certain embodiments, the resulting thermoplastic composite article can be consolidated by applying pressure to the surfaces of the composite article. For example and referring to FIG. 8A, the composite article may pass between rollers 810, 812 to compress the composite article and enhance bonding of the skin layer(s) 610, 620 to the core layer 512. The exact distance or gap between the rollers 810, 812 may vary depending on the desired pressure to be applied and depending on a desired final thickness for the composite article. In general, an overall thickness of the composite article decreases after passing through the rollers 810, 812. The rollers 810, 812 can be operated at room temperature, above room temperature or below room temperature. If desired, more than a single set of rollers 810, 812 can be present. For example and referring to FIG. 8B, a second set of rollers 820, 822 are shown. The gap between the different sets of rollers may be different. For example, a first set of rollers 810, 812 may include a first gap that is less than a gap between the rollers 820, 822. The gap between the various rollers may be fixed or may vary. For example, it may be desirable to compress certain areas of the composite article to a greater degree so the thickness at these compressed areas is lower. In some instances, edges of the composite article can be compressed more so a thickness at the side edges of the composite article is lower. Three, four or more sets of rollers may be present if desired. The rollers can be positioned within an oven or heating device, if desired, to maintain the core layer in a softened form during consolidation of the composite article.

Figure 9:
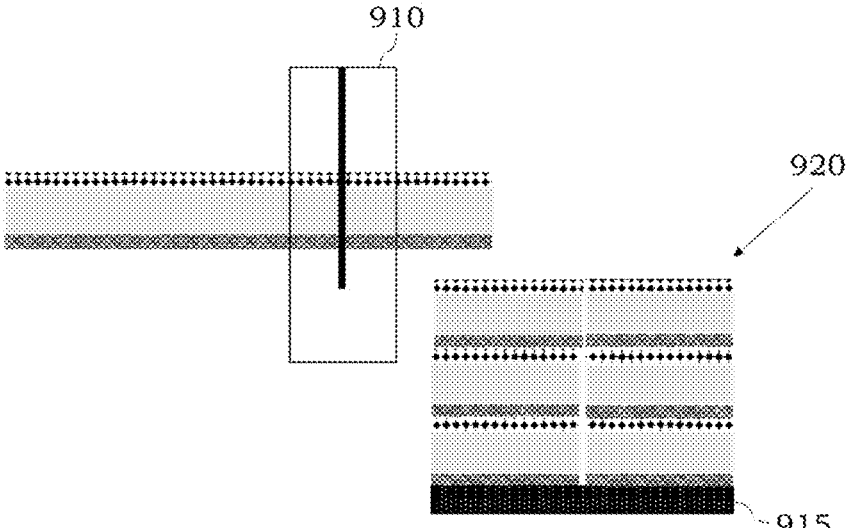
FIG. 9 is an illustration showing a cutting device that can be used to cut the moving composite article into individual composite articles, in accordance with certain embodiments.

In certain embodiments, once the composite article is consolidated, the continuous sheet of consolidated composite article can be cut or guillotined into individual sheets using a cutting device 910 (see FIG. 9). The resulting individual composite articles can be stacked or palletized, e.g., on pallet 915, for shipping as shown in the stack 920. The dimensions of the composite article in FIG. 9 have been intentionally enlarged to show the stacking, since the composite articles tend to be stacked as individual thin sheets with a thickness, for example, from 1 mm to about 30 mm. The exact size of the individual composite articles may vary from about 2 feet wide to about 8 feet wide and about 4 feet long to about 16 feet long. In some embodiments, the individual composite article may be about 4 feet wide and about 8 feet long so it has similar dimensions to plywood panels commonly used in recreational vehicles.

In certain configurations, the core layer that is produced using the in-line process can include reinforcing fibers in combination with a thermoplastic resin. For example, the core layer can be formed from a random arrangement of reinforcing fibers that are held in place by the thermoplastic resin material. The core layer typically comprises a substantial amount of open cell structure such that void space is present in the layers. In some instances, the porous core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges.

In certain embodiments, the thermoplastic material used to form the core layers described herein may include one or more of a polyolefin (e.g., one or more of polyethylene, polypropylene, etc.), polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the core layer can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the core layer can vary and illustrative amounts range from about 20% by weight to about 80% by weight, e.g., 30-70 percent by weight or 35-65 percent by weight, based on the total weight of the core layer. It will be recognized by the skilled person that the weight percentages of all materials used in the core layer will add to 100 weight percent.

In other embodiments, the reinforcing fibers of the core layers may comprise glass fibers, carbon fibers, graphite fibers, synthetic organic fibers, particularly high modulus organic fibers such as, for example, para- and meta-aramid fibers, nylon fibers, polyester fibers, a high melt flow index resin (e.g., 100 g/10 min. MFI or above) that is suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the core layers may independently be from about 20% to about 90% by weight of the core layer, more particularly from about 30% to about 70%, by weight of the core layer. The particular size and/or orientation of the fibers used may depend, at least in part, on the thermoplastic material used and/or the desired properties of the core layer. In one non-limiting illustration, fibers dispersed within a thermoplastic material and optionally other additives to provide the core layers can generally have a diameter of greater than about 5 microns, more particularly from about 5 microns to about 22 microns, and a length of from about 5 mm to about 200 mm, more particularly, the fiber diameter may be from about 2 microns to about 22 microns and the fiber length may be from about 5 mm to about 75 mm.

In certain embodiments, other additives may also be present in the mixture comprising the thermoplastic resin and the reinforcing fibers. For example, a lofting agent, flame retardants, colorants, smoke suppressants, surfactants, foams or other materials may be present. In some examples, the core layer may substantially halogen free or halogen free core layer to meet the restrictions on hazardous substances requirements for certain applications. In other instances, the core layer may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the core layers may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core layer), more particularly about 1 weight percent to about 13 weight percent, e.g., about 5 weight percent to about 13 weight percent based on the weight of the core layer. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the core layer. If desired, two different substantially halogen free flame retardants may be added to one or more of the core layers described herein. In certain instances, one or more of the core layers described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the core layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATH).

Figure 10A:
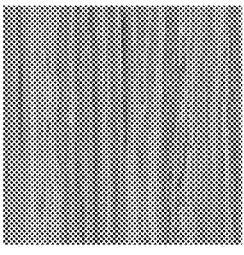
FIG. 10A, FIG. 10B, FIG. 10C, FIG. 10D, FIG. 10E, FIG. 10F, FIG. 10G, FIG. 10H, FIG. 10I, FIG. 10J, FIG. 10K, FIG. 10L, FIG. 10M, FIG. 10N and FIG. 10O show different patterns that can be present on a patterned skin layer, in accordance with some examples.
Figure 10B:
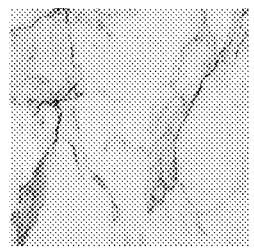
Figure 10C:
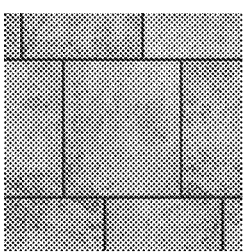
Figure 10D:
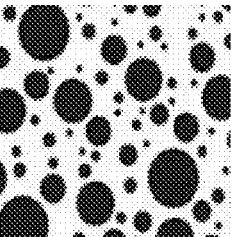
Figure 10E:
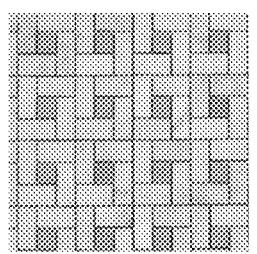
Figure 10F:
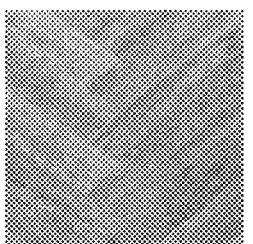
Figure 10G:
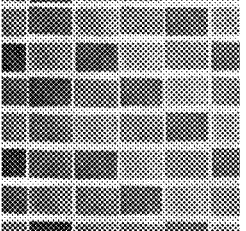
Figure 10H:
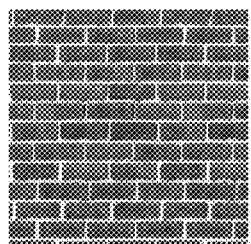
Figure 10I:
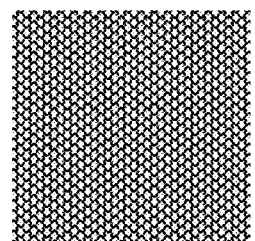
Figure 10J:
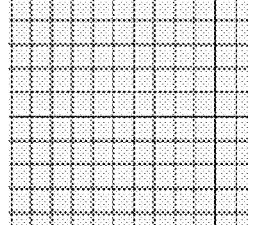
Figure 10K:
Figure 10L:
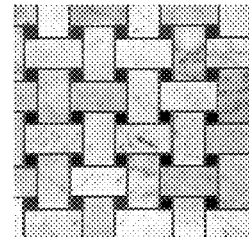
Figure 10M:
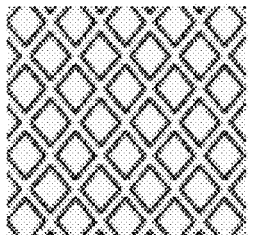
Figure 10N:
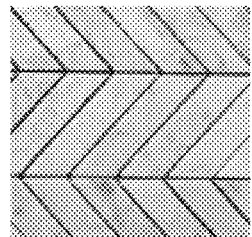
Figure 10O:
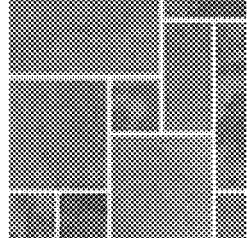

In certain embodiments, the skin layers 610, 620 may be the same or may be different. In one instance, the skin layer 610 is a decorative or patterned layer and the skin layer 620 can be a decorative or patterned layer or other types of skin layers. Where one or both of the skin layers 610, 620 is a patterned layer, the pattern may be the same or different at different areas of the skin layer. In some embodiments, a skin layer may comprise a pattern that is one or more of a woodgrain pattern (FIG. 10A), a marble pattern (FIG. 10B), a tile pattern (FIG. 10C), a random pattern (FIG. 10D), a pinwheel pattern (FIG. 10E), a herringbone pattern (FIG. 10F), a brick pattern (FIG. 10G), an offset staggered brick pattern (FIG. 10H), an offset pattern (FIG. 10I), a grid pattern (FIG. 10J), a stacked vertical pattern (FIG. 10K), a basket weave pattern (FIG. 10L), a diamond pattern (FIG. 10M), a chevron pattern (FIG. 10N) or a French pattern (FIG. 10O). Other patterns are also possible. In some embodiments, the pattern may already be present on the skin layer material when it is on the roll 605 or the roll 615. In other instances, a pattern can be printed onto a skin layer prior to applying the skin layer to the core layer. An illustration of a system that can include a printer to print a pattern on a skin layer is described in more detail below. Where one of the skin layers 610, 620 is a patterned skin layer, the other skin layer may be, for example, a thermoplastic film, a polyolefin film, an elastomer film, etc. In certain configurations, the film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly(amide-imide), poly(1,4-phenylene), at least one polycarbonate, at least one nylon, and at least one silicone. In other examples, the other skin layer may be, for example, a frim (film+scrim), a scrim (e.g., fiber based scrim), a foil, a woven fabric, a non-woven fabric or be present as an inorganic coating, an organic coating, or a thermoset coating. In other instances, the other skin layer may comprise a limiting oxygen index greater than about 22, as measured per ISO 4589 dated 1996. Where a fiber based scrim is present as (or as part of) the other skin layer, the fiber based scrim may comprise at least one of glass fibers, aramid fibers, graphite fibers, carbon fibers, inorganic mineral fibers, metal fibers, metalized synthetic fibers, and metalized inorganic fibers. If desired, the scrim may comprise materials or fibers produced from one or more of the thermoplastic materials described above in connection with the core layers. Where a thermoset coating is present as (or as part of) the other skin layer, the coating may comprise at least one of unsaturated polyurethanes, vinyl esters, phenolics and epoxies. Where an inorganic coating is present as (or as part of) the other skin layer, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the other skin layer, the non-woven fabric may comprise a thermoplastic material, a thermal setting binder, inorganic fibers, metal fibers, metallized inorganic fibers and metallized synthetic fibers. If desired, the other skin layer may also comprise a lofting agent, an expandable graphite material, a flame retardant material, fibers, etc.

In certain embodiments, the composite articles described herein may have desired surface properties on at least one surface. For example, the core layer of the articles described herein may be rough due to the presence of the reinforcing fibers. Adding a patterned layer to the core layer can decrease the overall surface roughness and/or mask the roughness of the core layer. While surface roughness can be measured in numerous ways, three roughness parameters, mean arithmetic deviation of profile (Ra), root-mean-square average of the profile heights (Rq), and maximum height (Rt) can be used as a measure of surface roughness. Ra is the average distance from the profile to the mean line over the length of assessment, Rq is the root-mean-square average of the profile heights over the evaluation length, and Rt is the vertical distance between the highest and lowest points of the profile within the evaluation length. See, for example, L. Mummery (1990). Surface texture analysis: the handbook. Hommelwerke, p. 106. Table 2 below shows the results. Surface roughness can be measured using a stylus profilometer and generally complies with the following standards: JIS (JIS-B0601-2001, JIS-B0601-1994, JIS B0601-1982), VDA, ISO 4287:1997, and ANSI. The parameters (Ra, Rq, Rz, and Rt) can be characterized by ISO 4287:1997.

In certain embodiments, surface roughness (Ra) on at least one surface of the composite article, e.g., the surface comprising the patterned layer, can be less than 10, 8, 8, 7, 6, 5, 4 or 3 microns in the machine direction and in the cross direction as measured by a stylus profilometer according to ISO 4287:1997. In other embodiments, a surface roughness (Ra), of a surface comprising the patterned layer, of the thermoplastic composite article is less than 2 microns in the machine direction and in the cross direction as measured by a stylus profilometer according to ISO 4287:1997. In other examples, an average RMS profile height (Rq) of at least one surface of the composite article, e.g., the surface comprising the patterned layer, can be less than 12, 11, 10, 9, 8, 7, 6, or 5 microns in the machine direction and in the cross direction as measured by a stylus profilometer according to ISO 4287:1997. In other embodiments, an average RMS profile height (Rq), of a surface comprising the patterned layer, of the thermoplastic composite article is less than 4 microns in the machine direction and in the cross direction as measured by a stylus profilometer according to ISO 4287:1997. In other examples, a maximum height (Rt) on at least one surface of the composite article, e.g., the surface comprising the patterned layer, can be less than 80, 70, 60, 50, 40, 35 or 30 microns in the machine direction and in the cross direction as measured by a stylus profilometer according to ISO 4287:1997. In other embodiments, a maximum height (Rt), of a surface comprising the patterned layer, of the thermoplastic composite article is less than 30 microns in the machine direction and in the cross direction as measured by a stylus profilometer according to ISO 4287:1997.

Figure 11A:
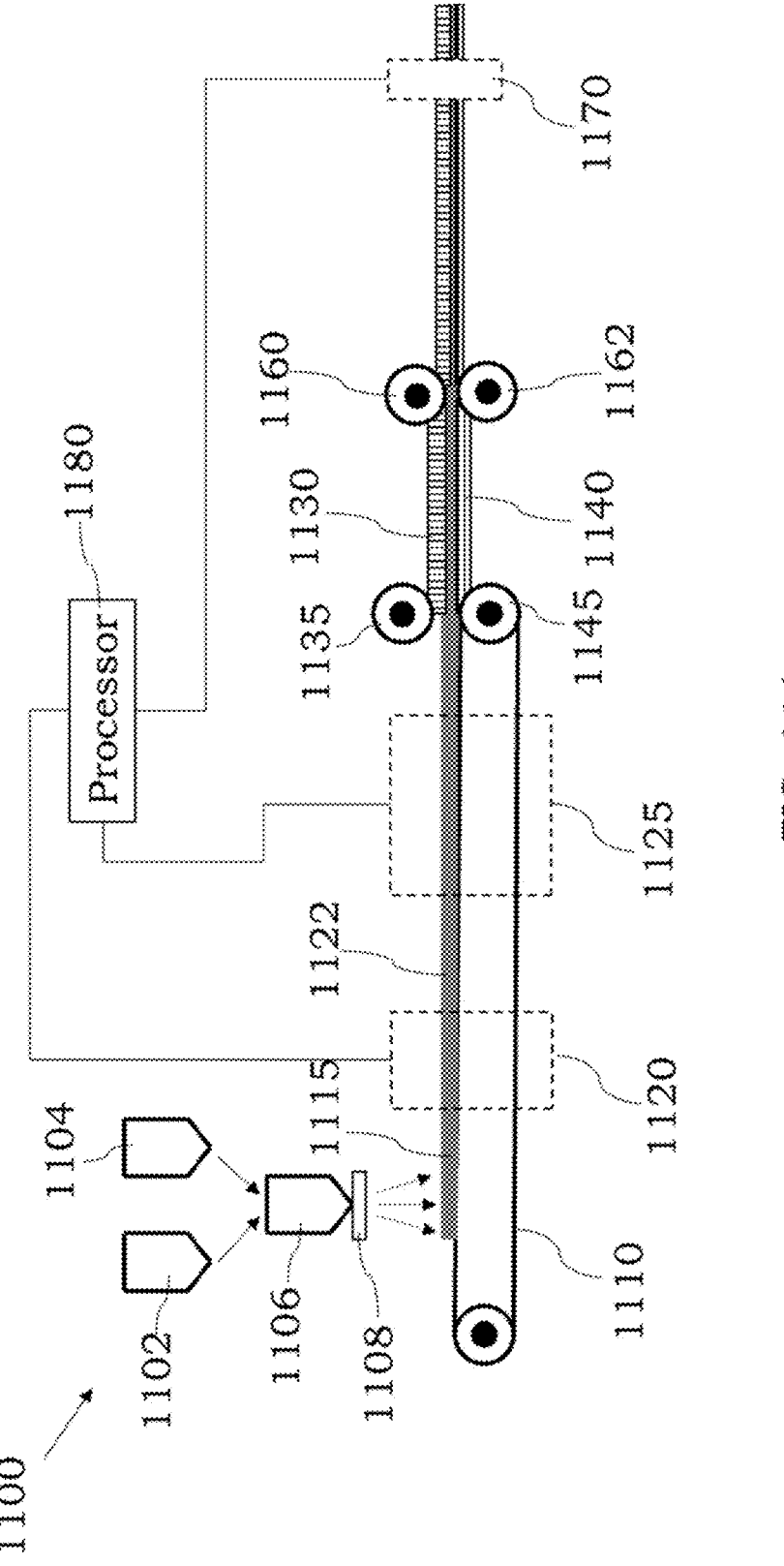
FIG. 11A, FIG. 11B, FIG. 11C and FIG. 11D are illustrations of systems that can be used to perform the in-line process, in accordance with certain embodiments.

In certain configurations, a system can be used to implement the in-line process. An illustration of components of the system are shown in FIG. 11A. The system 1100 includes reservoirs 1102, 1104. Reservoir 1102 can receive a thermoplastic material, and reservoir 1104 can receive reinforcing fibers. The reservoirs 1102, 1104 can provide materials to a mixing tank 1106. The mixing tank 1106 can be fluidically coupled to a spray head or nozzles 1108 to spray the mixed dispersion onto a moving support 1110. The web 1115 on the moving support 1110 can travel through a vacuum or other pressure device 1120, which can remove the liquid from the web 1115 to form a core layer 1122. The core layer 1122 can pass through a drying device 1125 to dry and heat the core layer. Skin layers 1130, 1140 can be applied from supply devices or rolls 1135, 1145 respectively onto opposite surface of the core layer 1122 to provide a composite article. The composite article can pass through a set of rollers 1160, 1162 to consolidate the composite article. The consolidated composite article can be cut into individual articles by cutting device 1170 as the sheet of moving, consolidated thermoplastic composite article passes through the cutting device 1170. A processor 1180 is shown that can control, for example, movement of the moving support 1110, spraying of the material onto the moving support 1110, and other devices and parameters used by the system 1100.

Figure 11B:
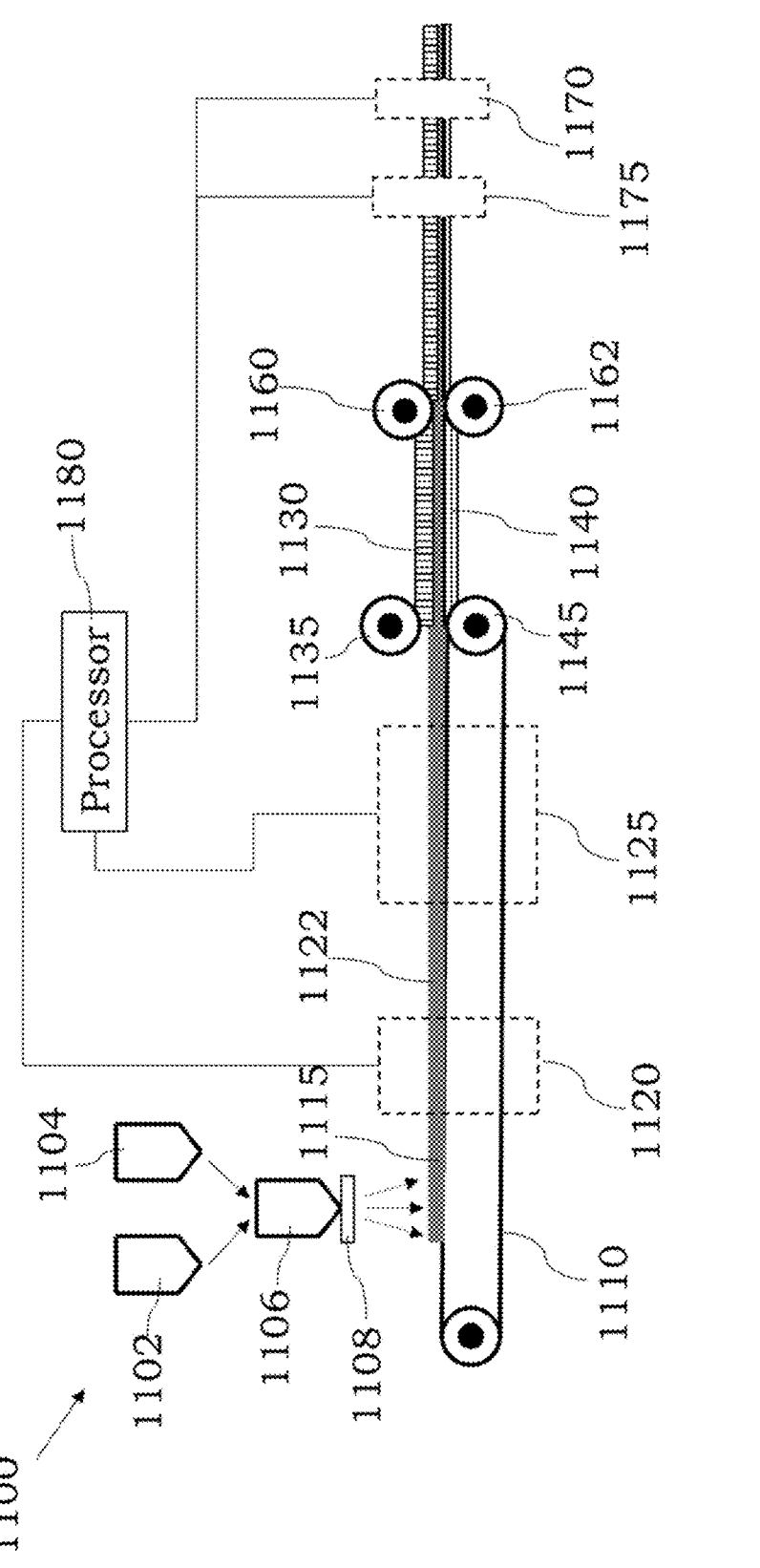
Figure 11C:
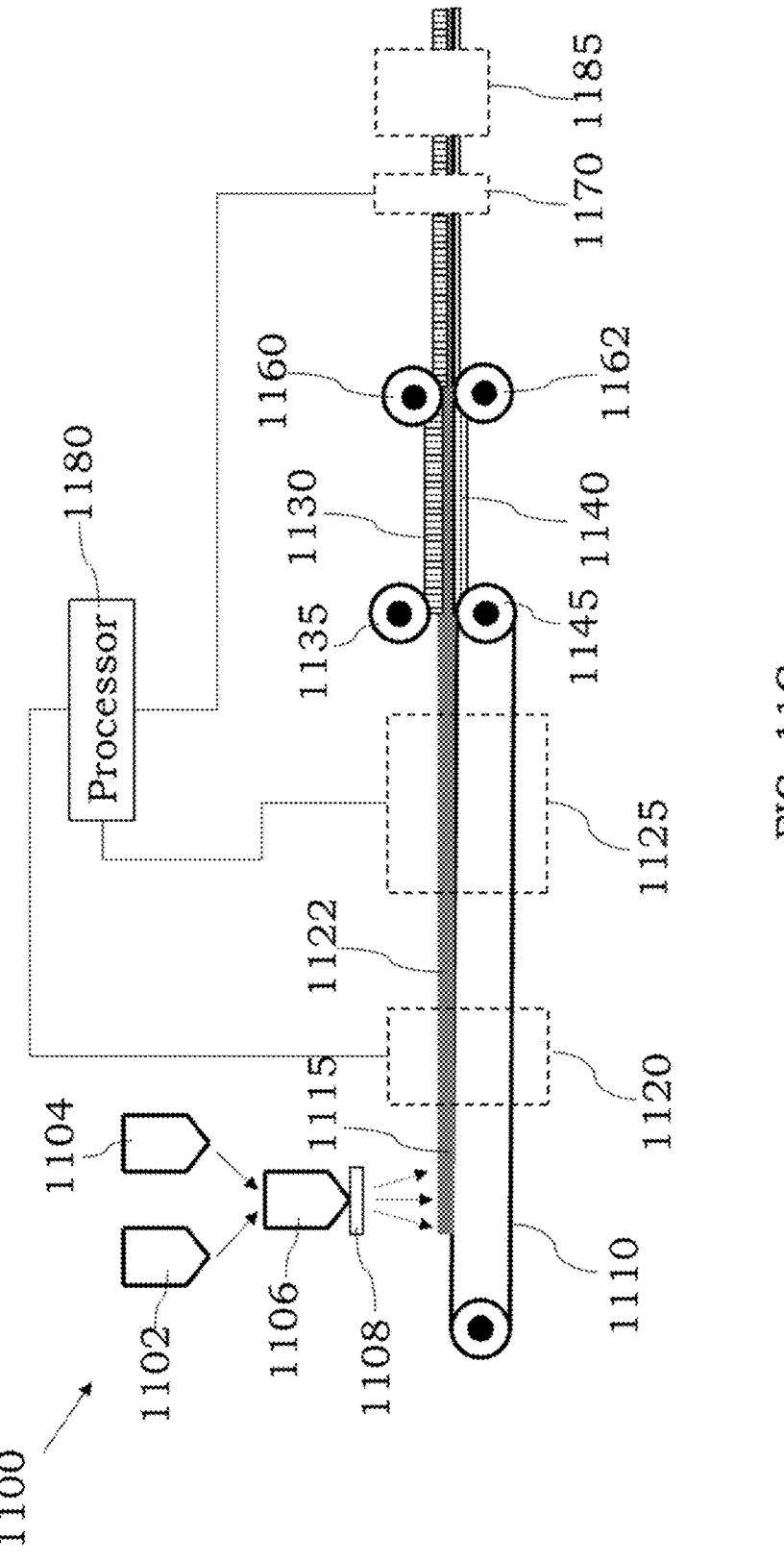
Figure 11D:
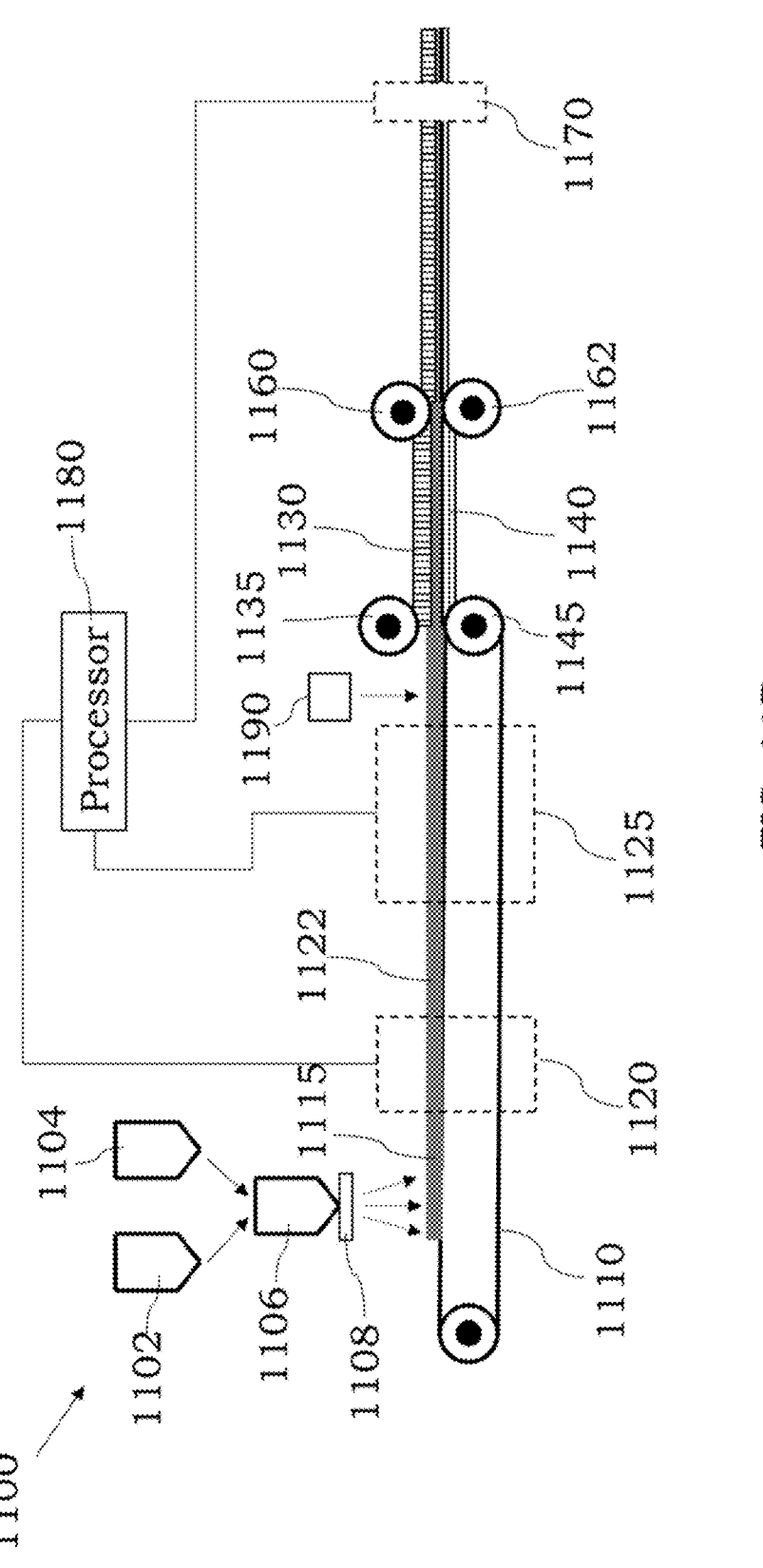

In certain examples, the system 1100 can include other components which can be present before or after the cutting device 1170. For example, the system 1100 can include another cutting station 1175 (FIG. 11B) designed to cut a tongue into one edge of the composite article and a cut a groove into an opposite edge of the composite article. This cutting permits different individual panels to fit into each other in use so there is some panel overlap at the joints. In other instances, the system 1100 can include another heating device 1185 (FIG. 11C) that can be used to loft or increase a thickness of the composite article. The heating device 1185 can be positioned before or after the cutting device 1170 as desired. An optional adhesive reservoir 1190 (FIG. 11D) can be present to provide an adhesive to the core layer before application of the skin layer 1130. A second adhesive reservoir (not shown) can also be present to provide an adhesive to the core layer before application of the skin layer 1140.

Figure 12:
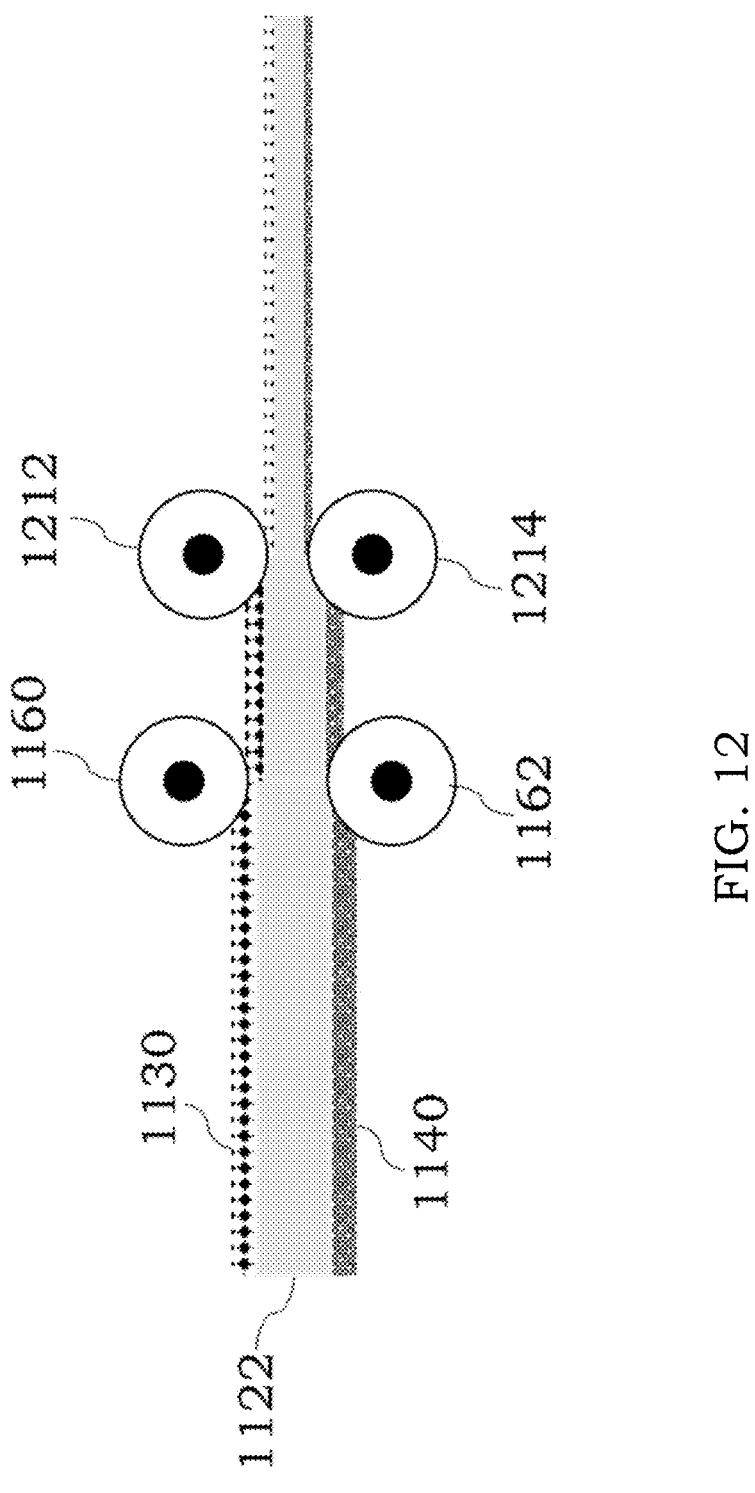
FIG. 12 is another illustration of a system that can be used to perform the in-line process, in accordance with certain embodiments.

In some embodiments, a system 1200 can include multiple sets of different rollers including rollers 1160, 1162 and rollers 1212, 1214 as shown in FIG. 12. The different rollers can be present at different temperature or provide different gap thicknesses to compress the composite article prior to exit of the composite article from the moving support. In some instances, the rollers 1212, 1214 can be used to compress edges of the composite article to a higher degree so the overall thickness at the edges of the composite article are lower than at a central area of the composite article. The thickness at different edges can be the same or can be different.

Figure 13:
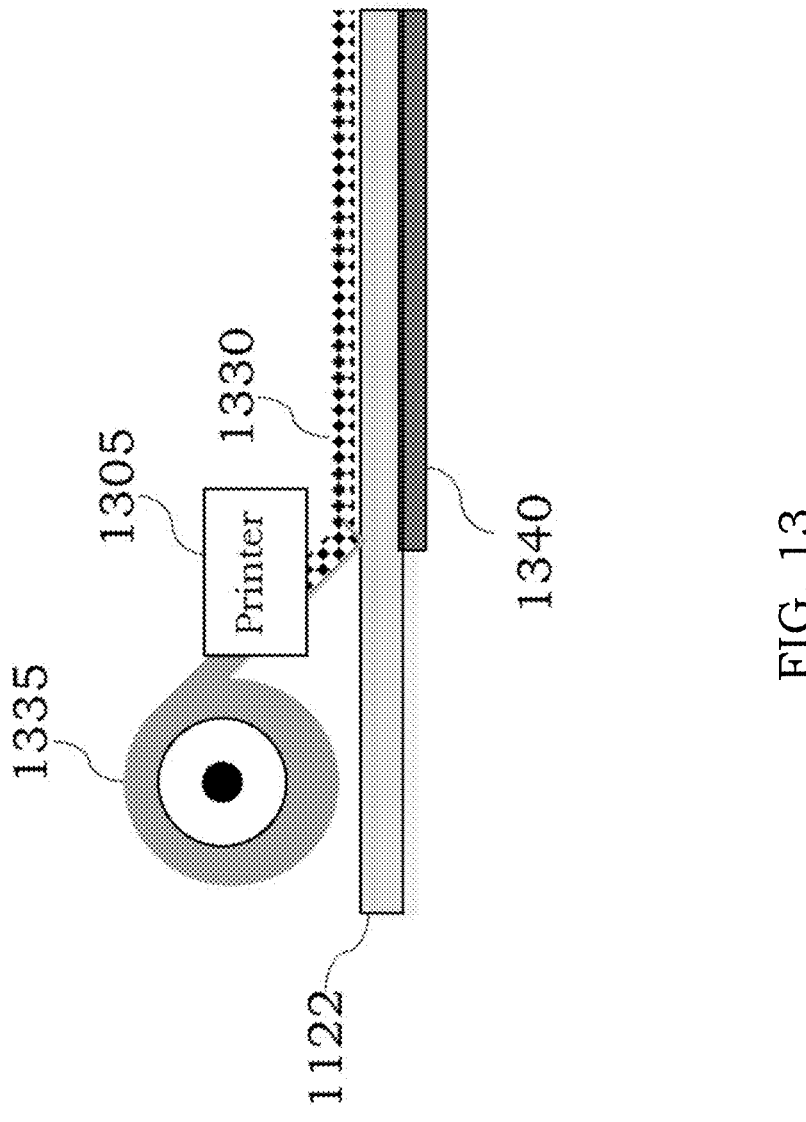
FIG. 13 is another illustration of a system that can be used to perform the in-line process, in accordance with certain embodiments.

In other embodiments, a system can include a printer 1310 that can print a pattern onto a skin layer prior to applying the skin layer to the core layer as shown in FIG. 13. The printer 1305 can spray, print or otherwise deposit an ink and other material, e.g., fibers, particles, powders, etc., onto a surface of the skin layer prior to the skin layer being applied to the core layer or after the skin layer is applied to the core layer. The printer 1305 can be positioned near a roll 1335 of skin layer to print a pattern onto a surface of the skin layer 1330 as it is unrolled from the roll 1335. While not shown, a printer can be positioned to apply a patterned layer to the skin layer 1340 after it has been applied to a surface of the core layer 1122. The exact pattern provided by the printer(s) can vary and may be different at different areas of the skin layer. For example, the pattern printed onto the skin layer may be one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern.

Figures 14, 15:
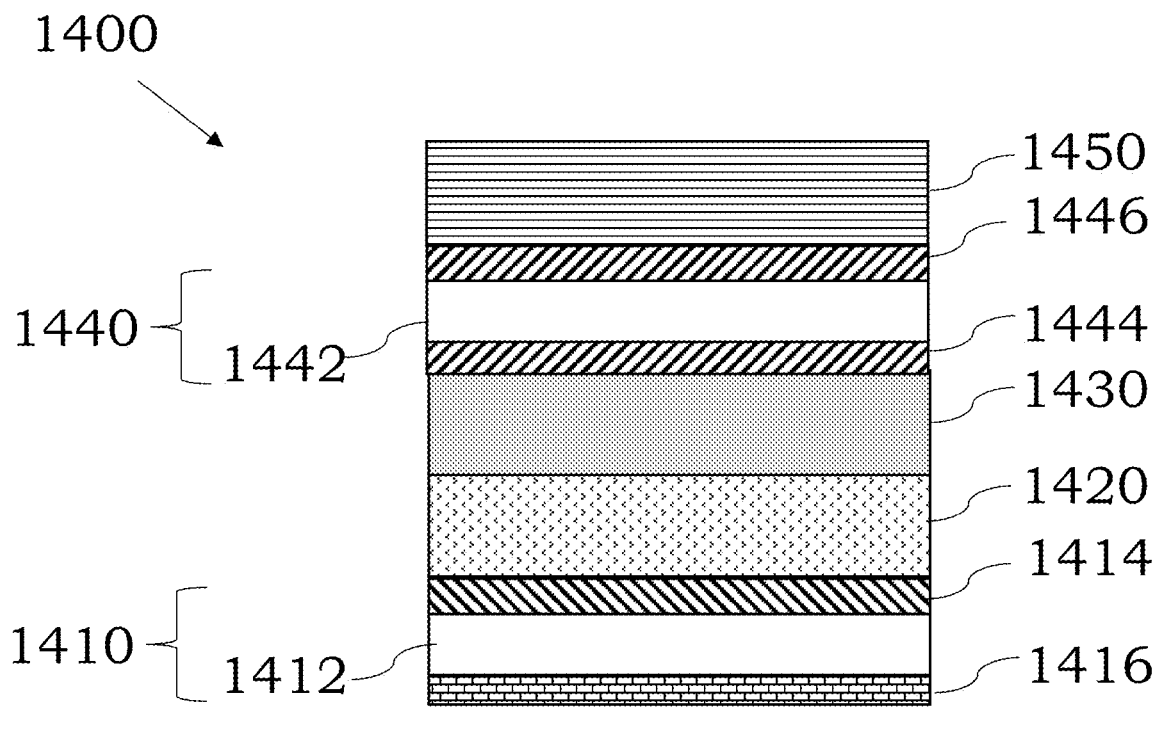
FIG. 14 is an illustration of a recreational vehicle (RV) wall, in accordance with some embodiments.
FIG. 15 is an illustration of a recreational vehicle that can include an RV wall as described herein, in accordance with some examples.

In certain embodiments, the in-line processes and in-line system described herein can be used to produce a side wall. The side wall can be present in a recreational vehicle or other vehicles, a cubicle, an office wall, a residential wall or in other settings. One illustration is shown in FIG. 14 where an RV wall 1400 includes a first laminated lightweight reinforced thermoplastic composite article 1410 comprising a porous core layer 1412, a first skin layer 1414 on a first surface of the porous core layer 1412 and a patterned second skin layer 1416 on a second surface of the porous core layer. The patterned skin layer 1416 is typically positioned so it faces an interior portion of the space formed by the RV wall 1400. The RV wall 1400 can also include a foam layer 1420 coupled to the first laminated lightweight reinforced thermoplastic composite article 1410 at a first surface of the foam layer. For example, the foam layer 1420 can be coupled to the first laminated lightweight reinforced thermoplastic composite article 1410 through the first skin layer 1414 of the first laminated lightweight reinforced thermoplastic composite article 1410 so the patterned second skin layer 1416 is present on an interior surface of the RV wall 1400. The RV wall 1400 also typically includes a support structure 1430, which can take the form of a chassis, tubing, a cage or other structures. The support structure 1430 typically includes a metal such as steel, aluminum or the metals. The support structure 1430 can be coupled a second surface of the foam layer 1420 at a first surface of the support structure 1430. A second laminated lightweight reinforced thermoplastic composite article 1440 can be coupled to a second surface of the support structure 1430. The second laminated lightweight reinforced thermoplastic composite article 1440 comprises a porous core layer 1442, a first skin layer 1444 on a first surface of the porous core layer 1442 and a second skin layer 1446 on a second surface of the porous core layer 1442. An exterior panel 1450 can be coupled to the second laminated lightweight reinforced thermoplastic composite article 1440 to form the RV wall 1400. In some examples, the exterior panel 1450 comprises fiberglass or aluminum.

As noted herein, the patterned second skin layer 1416 can include a pattern that is one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern. In certain embodiments, the first skin layer 1414 of the first laminated lightweight reinforced thermoplastic composite article 1410 comprises a scrim. In certain examples, the porous core layer 1412 in the first laminated lightweight reinforced thermoplastic composite article 1410 can include a web comprising open cell structures formed from reinforcing fibers held together by a thermoplastic material as noted above. In some examples, the porous core layer 1442 in the second laminated lightweight reinforced thermoplastic composite article comprises a web comprising open cell structures formed from reinforcing fibers held together by a thermoplastic material. In some configurations, the thermoplastic material in each porous core layer 1410, 1440 independently comprises a thermoplastic material as noted herein, e.g., a polyolefin such as, for example, polypropylene, polyethylene, etc. In some embodiments, the reinforcing materials in each porous core layer comprise reinforcing fibers as noted herein, e.g., glass fibers.

In certain embodiments, the RV wall may be present in a recreational vehicle comprising a roof, side walls coupled to the roof, and a floor coupled to the sidewalls to provide an interior space within the recreational vehicle, One illustration is shown in FIG. 15, where an RV 1500 comprises an RV wall 1510, which can be similar to the RV wall 1400 described above. The RV 1500 also includes a roof 1512, another side wall 1514 and a floor 1516. The RV 1500 may include wheels 1552, 1554 to permit towing of the RV and/or may include an engine, electric motor or other power source to permit independent movement of the RV.

In certain examples, the in-line methods and in-line systems described herein may be controlled using one or more processors, which can be part of the in-line system or otherwise electrically coupled to the in-line system through an associated device, e.g., computer, laptop, mobile device, etc. For example, the processor can be used to control the mixing speed of the materials, the speed of the moving support, the pressure used to remove liquid from the disposed dispersion, the temperature of the heating device(s), the pressure applied to the materials and other parameters of the process and system. Such processes may be performed automatically by the processor without the need for user intervention or a user may enter parameters through a user interface. In certain configurations, the processor may be present in one or more computer systems and/or common hardware circuitry including, for example, a microprocessor and/or suitable software for operating the system, e.g., to control the various fluid reservoirs, mixing tank, pressure devices, speed, temperatures, etc. The processor can be integral to the in-line system or may be present on one or more accessory boards, printed circuit boards or computers electrically coupled to the components of the in-line system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Intel Core™ processors, Intel Xeon™ processors, AMD Ryzen™ processors, AMD Athlon™ processors, AMD FX™ processors, Motorola PowerPC, Sun UltraSPARC, Hewlett-Packard PA-RISC processors, Apple-designed processors including Apple A14 Bionic processor, A13 Bionic processor, A12 processor, Apple A11 processor and others or any other type of processor. One or more of any type computer system may be used according to various embodiments of the technology. Further, the system may be connected to a single computer or may be distributed among a plurality of computers attached by a communications network. If desired, different components of the in-line system may be controlled by a respective processor or computer that is separate from a processor or computer used to control other components of the in-line system. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, temperatures, moving support speeds and other values used in the in-line process. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. The processor typically is electrically coupled to a power source which can, for example, be a direct current source, an alternating current source, a battery, a solar cell, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface, a USB interface, a Fibre Channel interface, a Firewire interface, a M.2 connector interface, a PCIE interface, a mSATA interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC), microprocessor units MPU) or a field programmable gate array (FPGA) or combinations thereof. Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system.

Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known microprocessors available from Intel, AMD, Apple and others. Many other processors are also commercially available. Such a processor usually executes an operating system which may be, for example, the Windows 7, Windows 8 or Windows 10 operating systems available from the Microsoft Corporation, MAC OS X, e.g., Snow Leopard, Lion, Mountain Lion, Mojave, High Sierra, El Capitan or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the in-line system remotely as desired.

In certain examples, the processor may also comprise or have access to a database of information about specific articles to be produced. For example, specific parameters used to produce a core layer of a desired thickness and composition can be retrieved from the database and used by the in-line system. The instructions stored in the memory can execute a software module or control routine for the system, which in effect can provide a controllable model of the in-line system. The processor can use information accessed from the database together with one or software modules executed in the processor to determine control parameters or values for different components of the systems, e.g., different temperatures, different pressures, different consolidation devices, etc. Using input interfaces to receive control instructions and output interfaces linked to different system components in the system, the processor can perform active control over the system.

Certain specific examples of LWRT articles that were produced using an in-line process and tested are discussed below

Example 1

A LWRT article was prepared by adding chopped glass fibers (e.g., 30-70% by weight) into a polypropylene (PP) resin matrix as reinforcement in an in-line process as described herein to form a web or core. A first skin (non-woven scrim with a basis weight of 23 gsm or g/m$^2$) was added to one surface of the core and a second skin (105 g/m$^2$ with a marble or woodgrain pattern) was added to an opposite surface using the in-line process along with in-line calendering to press the skins to the core and form an LWRT article.

Example 2

Various physical and analytical tests were conducted on disks with 99 mm diameter cut from the LWRT article of Example 1. The areal density (g/m$^2$ or gsm, 5 replicates), ash content (%, 5 replicates), density (g/cm$^3$, 5 replicates), and as-produced thickness (mm, 5 replicates) of the laminated decorative panels were measured. The results are shown in Table 1 below.

Figure 16B:
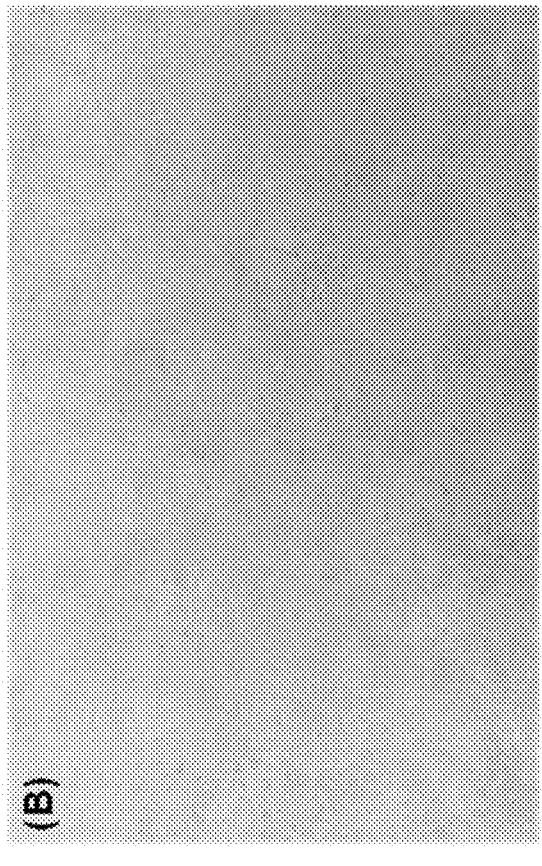
FIG. 16A and FIG. 16B are photographs showing a woodgrain pattern (FIG. 16A) and a marble pattern (FIG. 16B)
Figure 16A:
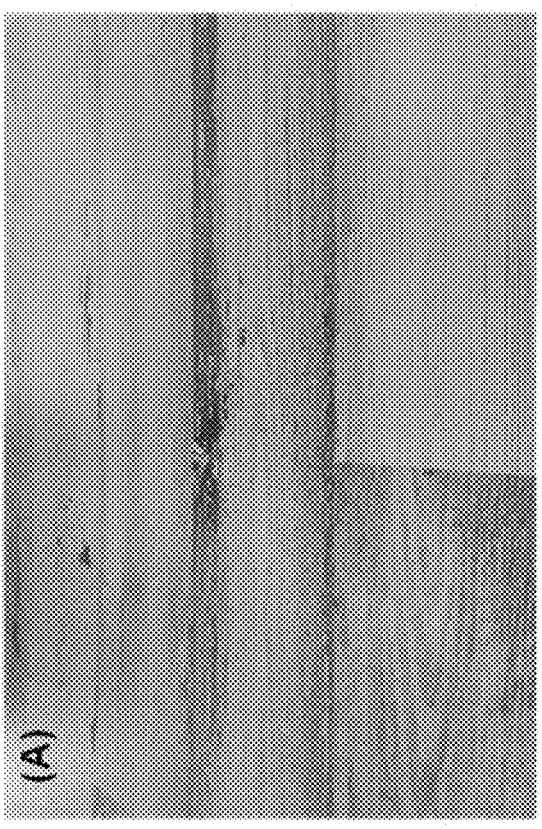

Since the PP/glass LWRT composite substrate has a porous structure with a high void content, significantly low densities were achieved. The densities are 0.35 and 0.36 g/cm$^3$ for the two samples, respectively. These LWRT composites are approximately 50% lighter than ordinary plywood, and comparable with modified plywood. Areal density and ash content of the two finished LWRT/décor samples are very close with standard deviation values in the range of ±5% of the average value, indicating these in-line laminated decorative composite panels are very uniform. The thickness for these in-line laminated decorative panels meets the flatness requirements of 2.9±0.2 mm for these decorative panels to be used for the interior layer of the RV sidewall. Photographs of the woodgrain (FIG. 16A) and the marble pattern (FIG. 16B) are shown.

Example 3

LWRT specimens from the LWRT article of Example 1 having a size of 75 mm×75 mm were cut from the LWRT board without surface skins and from the LWRT boards laminated with the décor (Woodgrain and Marble) by the inline lamination process. The surface roughness of ten samples was measured. One measurement was performed on each surface roughness test specimen along the machine direction (MD) and cross-machine direction (CD) using a stylus-type profilometer (Mitutoyo Surftest SJ-210). Tracing speed, stylus tip diameter, and tip angle were 10 mm/min, 4 mm, and 90 degrees, respectively. Three roughness parameters, mean arithmetic deviation of profile (Ra), root-mean-square average of the profile heights (Rq), and maximum height (Rt) were recorded. Ra is the average distance from the profile to the mean line over the length of assessment, Rq is the root-mean-square average of the profile heights over the evaluation length, and Rt is the vertical distance between the highest and lowest points of the profile within the evaluation length. See, for example, L. Mummery (1990). Surface texture analysis: the handbook. Hommelwerke, p. 106. Table 2 below shows the results.

TABLE 1

Physical properties of in-line laminated LWRT composite decorative panels.

| Sample Code | Skin layer 1 | Skin layer 2 | Areal density (g/m$^2$) | Ash (%) | Density (g/cm$^3$) | Thickness (mm) |
|---|---|---|---|---|---|---|
| Woodgrain | 23 gsm scrim | Décor with printed woodgrain pattern | 1102 ± 23 | 49.4 ± 0.2 | 0.35 ± 0.07 | 2.98 ± 0.04 |
| Marble | 23 gsm scrim | Décor with printed marble-like pattern | 1094 ± 12 | 49.5 ± 0.1 | 0.36 ± 0.08 | 2.90 ± 0.06 |

TABLE 2

| Surface roughness parameters of the in-line laminated decorative panels. | | | | | | |
|---|---|---|---|---|---|---|
| | Surface Roughness (MD) | | | Surface Roughness (CD) | | |
| Samples | $R_a$, µm | $R_q$, µm | $R_t$, µm | $R_a$, µm | $R_q$, µm | $R_t$, µm |
| PP/glass LWRT bare surface | 13.6 ± 1.5 | 16.9 ± 1.9 | 100.0 ± 9.6 | 18.4 ± 0.9 | 22.6 ± 1.2 | 139.0 ± 14.8 |
| Woodgrain | 1.4 ± 0.2 | 1.7 ± 0.2 | 11.2 ± 2.7 | 1.4 ± 0.1 | 1.6 ± 0.2 | 12.5 ± 2.0 |
| Marble | 2.8 ± 0.7 | 3.7 ± 0.7 | 25.4 ± 3.2 | 2.9 ± 0.5 | 3.7 ± 0.5 | 27.2 ± 2.9 |

PP/glass LWRT composite bare surface has Ra, Rq and Rt values of 13.6, 16.9 and 100.0 microns in the machine direction (MD) and 18.4, 22.6 and 139 microns in the cross direction (CD). Surface roughness is higher for CD than that for MD, indicating better alignment of glass fibers in the machine direction than in the cross direction during the in-line lamination process. In both MD and CD, the values of Ra, Rq and Rt for both decorative patterns are significantly lower than those values for PP/glass LWRT bare surfaces, which further indicates that laminating these kinds of décor onto LWRT composite substrate can cover the porous structure of LWRT core board and efficiently improve the surface smoothness and appearance accordingly. For example, Ra was decreased significantly to 1.4 microns in both MD and CD from PP/glass LWRT bare surface to woodgrain pattern décor panel's surface, which is lower than the surface roughness (Ra) of plywood. These results are consistent with the decorative layers especially the woodgrain pattern, being sufficiently thick to sufficiently cover the core texture of LWRT composites.

Example 4

A 180 degree peel test was performed on the décor and scrim sides for the two laminated decorative samples with woodgrain (Woodgrain) or marble-like (Marble) patterns on an MTS testing machine with a 250 N load cell following ASTM standard D903-2004. Rectangular (25 mm×100 mm) specimens (10 replicates) were cut from a production sheet in MD and CD. The cross-head speed, span, anvil diameter, and nose diameter were 15 mm/min, 64 mm, 6.4 mm, and 6.4 mm, respectively. The results are shown in Table 3.

TABLE 3

| Adhesion strength between décor or scrim and LWRT composite core substrate. | | | | | |
|---|---|---|---|---|---|
| Sample | Décor/ | Peak load MD (N) | | Peak load CD (N) | |
| code | Scrim | Avg. | Std. dev. | Avg. | Std. dev. |
| Woodgrain | Décor | Separation between layers cannot be initiated | | | |
| | Scrim | Separation between layers cannot be initiated | | | |
| Marble | Décor | Separation between layers cannot be initiated | | | |
| | Scrim | Separation between layers cannot be initiated | | | |

Neither the décor nor the scrim could be separated from composite core substrate, indicating a good interfacial bonding between the skin materials and PP/glass LWRT core board under ambient conditions.

Example 5

A flatwise tensile (FWT) test of the as-produced decorative panel of the two samples (Woodgrain and Marble) was performed on an MTS mechanical testing machine according to ASTM C297-04. Ten specimens (51 mm×51 mm) were cut out across CD from a production panel. Cross head speed was 50 mm/min and the load cell was 5 kN. Each specimen was bonded onto tensile fixtures/end tabs (top and bottom) with urethane glue/adhesive (3M Scotch-Weld 3535; ratio of weight for Base to Accelerator is 100:105; density is about 1.29 g/cm3), and the glued samples were left in air for 24 hours to allow the glue to fully cure. The flatwise tensile (FWT) strength is an desirable criterion for a flat panel being used for the RV sidewall application. The results are shown in FIG. 17A (woodgrain decorative skin) and FIG. 17B (marble decorative skin).

From the pictures of the tested specimens, it can be seen that nearly all the specimens failed either on the surface of the décor at the interface between décor and testing fixture, or due to a glue failure. Averaged peak load values for Woodgrain and Marble samples were 1545 and 1172 N, respectively, which are significantly higher than most of the FWT peak load values of EPS foams (<700 N) reported in the literature, while EPS foam is one of the most commonly used insulation foam in the RV sidewall construction. These results are consistent with the as-produced decorative panels being much stronger in z-direction through thickness as compared to EPS foams, which would reduce the likelihood that the finished RV sidewall panels would not be delaminated within the decorative panel.

Example 6

Figures 18A, 18B:
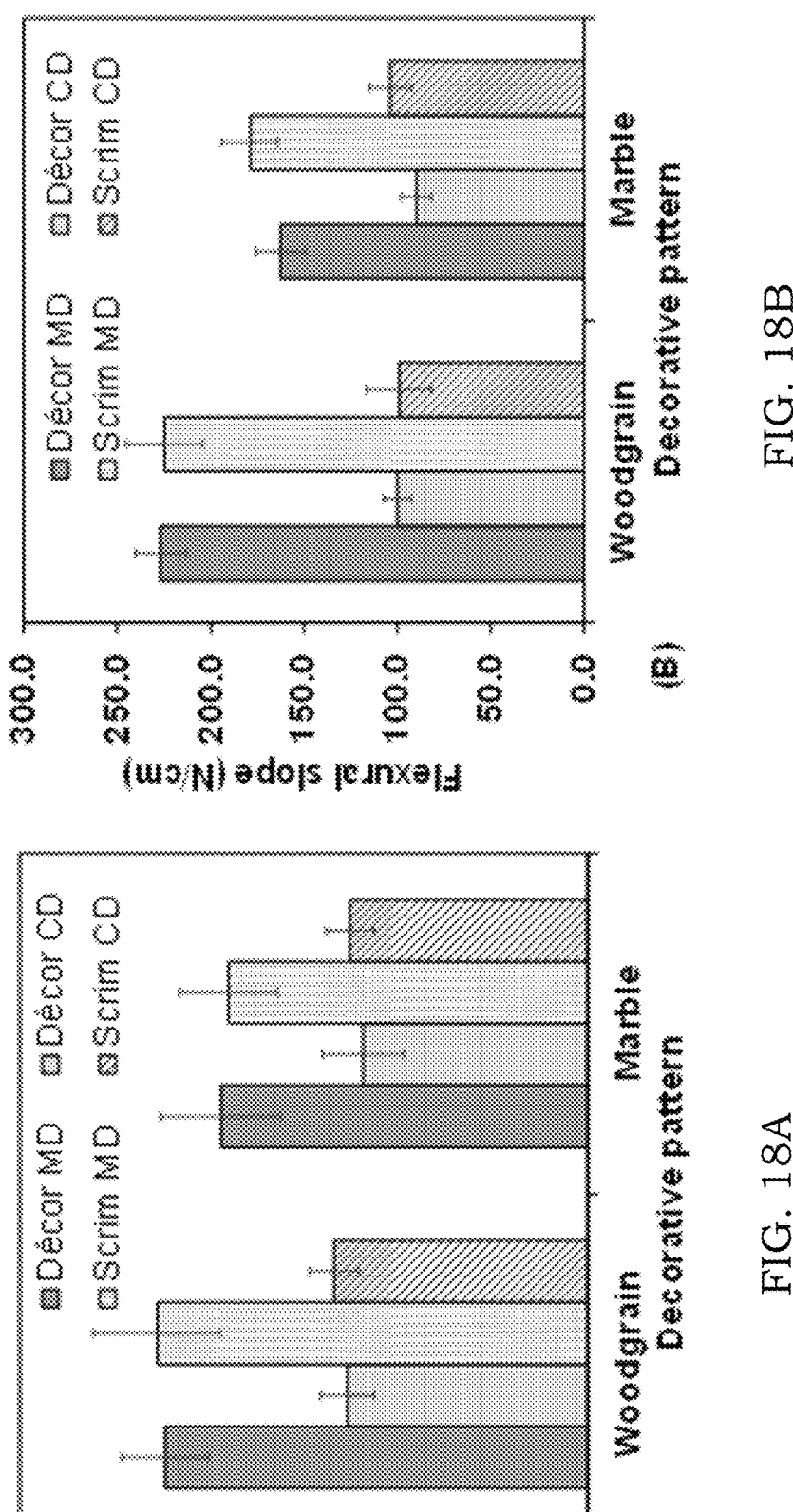
FIG. 18A and FIG. 18B are illustrations showing peak load (FIG. 18A) and flexural slope (FIG. 18B) for certain test specimens.

A flexural (3-point bending) testing was performed on as-produced laminated panels (Woodgrain and Marble) according to ASTM D790-2007. Rectangular (25 mm×100 mm) specimens (10 replicates) were cut from panels in the directions of both MD and CD. The test was performed with sample's scrim side or décor side facing against the load using a MTS mechanical testing machine using a 250 N load cell. The cross-head speed, span, anvil diameter, and nose diameter were set to be 15 mm/min, 64 mm, 6.4 mm, and 6.4 mm, respectively. Significance in the flexural strength and modulus were statistically analyzed using one-way analysis of variance (ANOVA) by software R version Ri386-3.5.0 (The R Foundation, https://www.r-project.org/) at an α level of 0.05 employing a Tukey's test. The results are shown in FIGS. 18A (peak load) and 18B (modulus).

For the flexural strength (peak load), with the scrim side facing against load (or facing up) during the bending test, the Woodgrain sample has significantly higher strength (20% higher) than the Marble sample in the MD. With the décor or scrim side facing up, stiffness for Woodgrain sample has significantly higher values than the Marble sample in MD. For example, the slope values of Woodgrain sample are 26% and 40% higher than the Marble sample when the scrim side and décor side faced up respectively during the test. Overall trend for both samples is the flexural strength and stiffness are better in the MD than in the CD, which again is attributed to the better glass alignment in the MD than in CD. In addition, in both MD and CD for both samples, the décor side facing up during the testing can have higher strength and stiffness than the scrim side facing up. This suggests laminating a décor skin layer onto LWRT composite improves the overall strength and stiffness of resulting decorative panels as compared with LWRT having both sides as scrims as being used in RV sidewall construction.

Example 7

The flammability performance was evaluated following two standards, Federal Motor Vehicle Safety Standards (FMVSS 302-03) and ASTM E84. FMVSS 302 is more commonly accepted in automotive interior applications, while the performance tested by ASTM E84 method gives more insight to the performance expected by building and construction industries including RV industry. Specimens were cut into 304.8 mm×25.4 mm and tested horizontally based on FMVSS 302. In the ASTM E84 test, both samples (Woodgrain and Marble) were cut into 0.61 m×1.83 m and evaluated for flame spread index (FSI) and smoke development index (SDI) in order to classify the material into Class A, B or C. The results are shown in Table 4.

TABLE 4

Flammability performance of the two decorative panels.

| Sample | Burning Rate by FMVSS 302 Test, mm/min | FSI and SDI by ASTM E84 Test |
|---|---|---|
| Woodgrain | 33.8 ± 0.5 | FSI = 25; SDI = 50 |
| Marble | 47.0 ± 6.4 | FSI = 125; SDI = 30 |

From the FMVSS 302 test, the Woodgrain sample burned 30% slower than the Marble sample. Flame spread index (FSI) of Woodgrain sample was 25, meeting the Class A performance (FSI≤25) and the smoke development index (SDI) was 50 which is significantly lower than the Class A, B or C requirement (SDI≤450). In comparison, the Marble sample has FSI of 125 and SDI of 30, meeting Class C requirement. The only difference between these two samples was the decorative material's decorative pattern; hence, the better FR performance of the Woodgrain sample could be due to the difference from the marble-like pattern and woodgrain pattern. However, the Marble sample already meets the FR requirement for the single component of the RV sidewall for ASTM E84 Class C.

Example 8

Figures 19A, 19B:
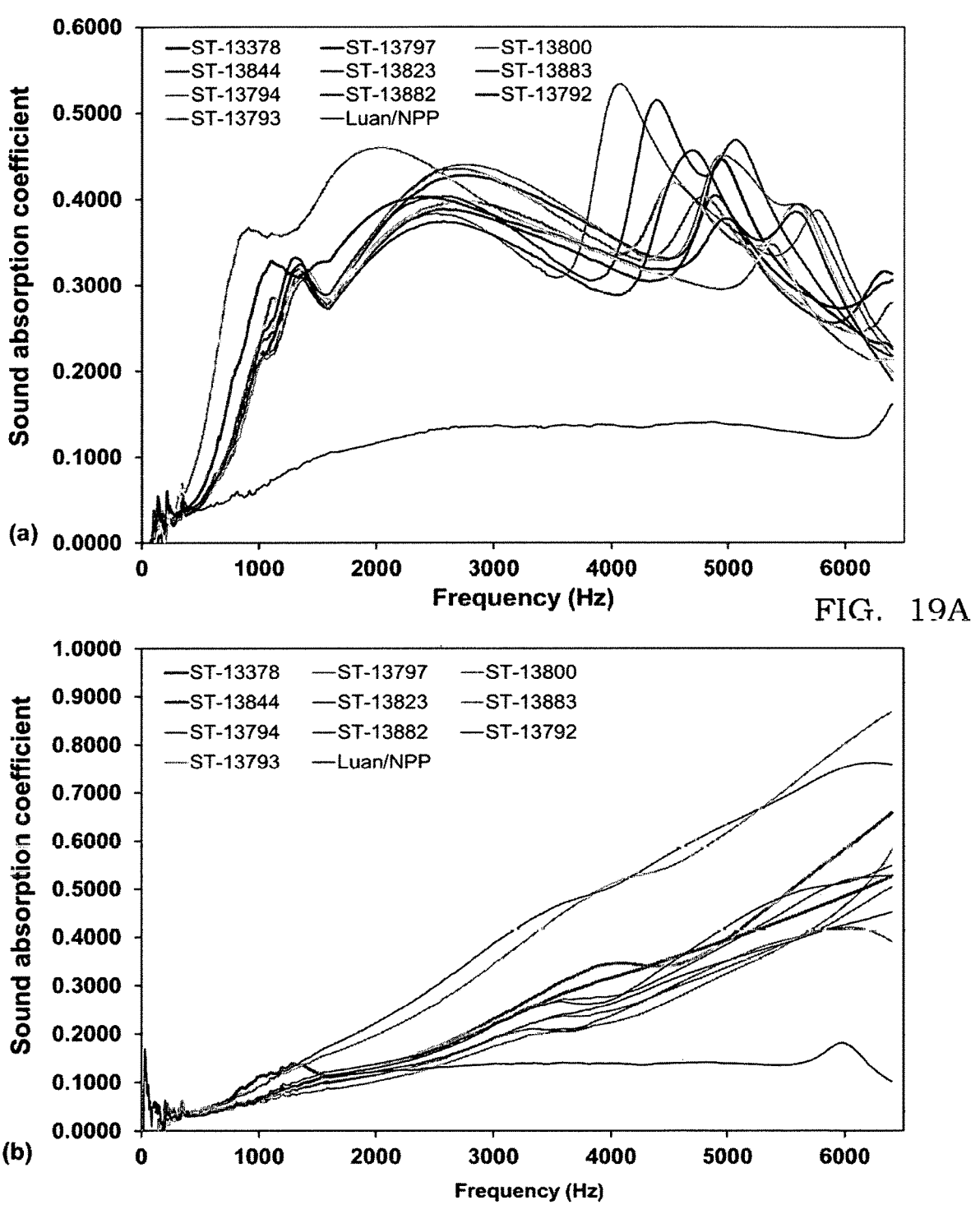
FIG. 19A and FIG. 19B show sound absorption test results for tested samples and a reference sample.

The sound absorption property, sound absorption coefficient, was determined for the article of Example 1 and Luan/NPP decorative panels using a two-microphone transfer-function method, in accordance to the ASTM E1050-98 standard. Luan plywood panel was laminated with NPP pattern decorative paper by a secondary lamination process. The frequency range at which the assessments were performed was 100 to 6500 Hz. Every sample was tested with the decorative side or scrim side (bare Luan surface for Luan/NPP panel) facing to the sound source. The results are shown in FIG. 19A (decorative side toward sound source) and FIG. 19B (scrim side toward sound source).

The different tested samples including the following composition: ST-13792 included a LWRT core layer with a basis weight of 1200 g/m², a thickness of 3.6 mm, 45% by weight polypropylene and 55% by weight glass fibers. ST-13793 included a LWRT core layer with a basis weight of 1670 g/m², a thickness of 4.7 mm, 50% by weight polypropylene and 50% by weight glass fibers. All other tested samples had a LWRT core layer with a basis weight of 960 g/m², a thickness of 2.7 mm, 45% by weight polypropylene and 55% by weight glass fibers. The overall dimensions of each sheet sample produced was about 1219 mm wide by 2438 mm long (roughly 4 feet by 8 feet). Sample ST-13378 included a marble patterned layer on an outer surface. Samples ST-13794 and ST-13882 included a fabric patterned layer on an outer surface. The remaining samples including a wood grain patterned layer on an outer surface.

The acoustic characterization of the materials was based on the sound absorption coefficient, α; this parameter is the ratio of absorbed sound intensity to incident sound intensity on a surface. If α value is close to 1, with an absorption plateau at this value on a large frequency range, this material can be considered to have good sound absorption properties. The sound absorption capacity of LWRT articles can be influenced by various factors, such as areal density, density, thickness, and the filler (type and content).

In the full frequency range (100-6500 Hz), the sound absorption coefficient of the tested samples were significantly higher than the Luan/NPP decorative panel no matter which surface was facing the sound source. When the decorative paper side faced to sound source, the coefficient varied from 0.1 to 0.5, while this value was only about 0.1-0.2 for the Luan/NPP panel. When the scrim side faced to the sound source, the coefficient value varied from 0.1 to 0.9 for the RVX3.6 core (ST-13792) and RVZ4.7 core (ST-13793) based samples. RVX2.7 core based samples showed this coefficient in the range of 0.1 and 0.7, while Luan/NPP sample only had this value of 0.1-0.2. The LWRT panels can decrease sound/noise reflection significantly as compared with Luan/NPP panel. The thicker the substrate the better sound absorption performance can be achieved.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. An in-line process of producing a thermoplastic composite article using an in-line system, the in-line process comprising:

combining reinforcing materials and a thermoplastic polyolefin material in an aqueous solution to provide a homogenous liquid dispersion of the reinforcing materials in the thermoplastic polyolefin material;

disposing the homogeneous liquid dispersion with the combined reinforcing materials and the thermoplastic polyolefin material onto a moving support comprising a mesh size of 60 openings/square inch to 80 openings per/square inch;

removing water from the disposed homogeneous liquid dispersion on the moving support to form a porous wet web comprising open cell structures formed by random crossing over of the reinforcing materials held in place by the thermoplastic polyolefin material;

drying the porous wet web on the moving support to provide a porous core layer;

heating the porous core layer on the moving support to melt the thermoplastic material of the porous core layer;

disposing a first skin layer on a first surface of the heated, porous core layer on the moving support;

disposing a second skin layer on a second surface of the heated, porous core layer; and applying pressure to the heated, porous core layer comprising the disposed first skin layer and the disposed second skin layer on the moving support to provide a thermoplastic composite article.

2. The in-line process of claim 1, wherein the dried, porous core layer is heated at a first temperature above the melting point of the thermoplastic material and below the melting point of the reinforcing materials.

3. The in-line process of claim 1, further comprising adding a foam to the aqueous solution with the combined reinforcing materials and the thermoplastic polyolefin material.

4. The in-line process of claim 1, further comprising adding a lofting agent to the aqueous solution with the combined reinforcing materials and the thermoplastic polyolefin material.

5. The in-line process of claim 1, further comprising configuring the first skin layer as a scrim.

6. The in-line process of claim 5, further comprising configuring the second skin layer as a patterned layer.

7. The in-line process of claim 6, wherein a pattern of the patterned layer is one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern.

8. The in-line process of claim, 7 wherein the thermoplastic polyolefin material comprises polypropylene and the reinforcing materials comprise inorganic fibers.

9. The in-line process of claim 1, wherein a surface roughness (Ra) of the thermoplastic composite article is less than 3 microns in the machine direction and in the cross direction as measured by a stylus profilometer according to ISO 4287:1997.

10. The in-line process of claim 1, wherein a surface roughness (Ra) of the thermoplastic composite article is less than 2 microns in the machine direction and in the cross direction as measured by a stylus profilometer according to ISO 4287:1997.

11. The in-line process of claim 1, wherein the first skin layer is disposed on the heated, porous core layer without using any adhesive between the first skin layer and the heated, porous core layer.

12. The in-line process of claim 1, further comprising disposing an adhesive on the second surface of the heated, porous core layer prior to disposing the second skin layer on the second surface.

13. The in-line process of claim 12, wherein the adhesive comprises a polyolefin or a polyurethane.

14. The in-line process of claim 1, further comprising cutting a groove into a first end of the thermoplastic composite article.

15. The in-line process of claim 14, further comprising cutting a tongue in a second end of the thermoplastic composite article.

16. The in-line process of claim 1, further comprising consolidating the heated, porous core layer prior to disposing the first skin layer on the first surface and prior to disposing the second skin layer on the second surface of the heated, porous core layer.

17. The in-line process of claim 16, further comprising heating the thermoplastic composite article after consolidating the thermoplastic composite article to increase an overall thickness of the thermoplastic composite article.

18. The in-line process of claim 1, further comprising printing a pattern onto the second skin layer prior to disposing the second skin layer on the second surface of the heated, porous core layer.

19. The in-line process of claim 1, further comprising printing a pattern onto the second skin layer after disposing the second skin layer on the second surface of the heated, porous core layer.

20. The in-line process of claim 1, further comprising compressing lateral edges of the heated, porous core layer, wherein the compressed lateral edges of the heated, porous core layer have a lower thickness than a thickness at a central area of the heated, porous core layer.

* * * * *